(12) United States Patent  
Murakami et al.

(10) Patent No.: US 6,748,026 B1  
(45) Date of Patent: Jun. 8, 2004

(54) DISTORTION ESTIMATION APPARATUS, FREQUENCY OFFSET COMPENSATION APPARATUS AND RECEPTION APPARATUS

(75) Inventors: Yutaka Murakami, Yokohama (JP); Shinichiro Takabayashi, Kawasaki (JP); Masayuki Orihashi, Ichikawa (JP); Akihiko Matsuoka, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/499,303

(22) Filed: Feb. 7, 2000

(30) Foreign Application Priority Data

Feb. 12, 1999 (JP) .......................................... 11-034038  
Feb. 19, 1999 (JP) .......................................... 11-041227  
Feb. 23, 1999 (JP) .......................................... 11-044390

(51) Int. Cl.$^7$ ............................................. H03K 9/00  
(52) U.S. Cl. ....................................... 375/316; 375/344  
(58) Field of Search ................................ 375/261, 331, 375/269, 280, 281, 284, 285, 296, 323, 335, 348, 343; 329/318, 319, 320, 349, 304, 306

(56) References Cited

U.S. PATENT DOCUMENTS

| | | | |
|---|---|---|---|
| 5,590,158 A | * 12/1996 | Yamaguchi et al. | ......... 375/331 |
| 5,717,722 A | * 2/1998 | Mori | .......................... 375/326 |
| 5,875,215 A | * 2/1999 | Dobrica | ....................... 375/344 |
| 5,959,965 A | * 9/1999 | Ohkubo et al. | .............. 370/203 |
| 6,275,685 B1 | * 8/2001 | Wessel et al. | ................ 455/126 |
| 6,347,126 B1 | * 2/2002 | Nagayasu et al. | ........... 375/344 |

FOREIGN PATENT DOCUMENTS

| | | |
|---|---|---|
| JP | 1-196924 | 8/1989 |
| JP | 9-93302 | 4/1997 |

OTHER PUBLICATIONS

English Language Abstract of JP 9/93302.

English Language Abstract of JP 1/196924.

"Rayleigh Fading Compensation Method for 16QAM MODEM in Digital Land Mobile Radio Systems", S. Sampei, Tech Rep. of IEICE B–II, No. 1, pp. 7–15, Jan. 1989.

* cited by examiner

*Primary Examiner*—Emmanuel Bayard  
(74) *Attorney, Agent, or Firm*—Greenblum & Bernstein, P.L.C.

(57) ABSTRACT

In-phase component approximation section 111 calculates an amplitude variation amount of an in-phase component of a data symbol from an amplitude variation amount of an in-phase component of a pilot symbol approximately. Quadrature component approximation section 112 calculates an amplitude variation amount of a quadrature component of the data symbol from an amplitude variation amount of a quadrature component of the pilot symbol approximately. Amplitude variation calculation section 113 calculates an amplitude variation amount of each data symbol from the amplitude variation amounts of the in-phase component and quadrature component of each data symbol. Phase variation calculation section 114 calculates a phase variation amount of the data symbol from a phase variation amount of the pilot symbol approximately. Thus, by calculating the amplitude variation amount of the data symbol and the phase variation amount of the data symbol separately, even in the case where a frequency offset between a transmitter and receiver is large, it is possible to estimate the frequency offset and fading distortion with high accuracy, and to suppress the deterioration of bit error rate characteristic.

12 Claims, 19 Drawing Sheets

DISTORTION ESTIMATION APPARATUS, FREQUENCY OFFSET COMPENSATION APPARATUS AND RECEPTION APPARATUS

BACKGROUND OF THE INVENTION

1. Field of the Invention

The present invention relates to a distortion estimation apparatus, frequency offset compensation apparatus, reception apparatus and their method used in a radio communication apparatus.

2. Description of the Related Art

In radio communications for which the demand has been increased rapidly in recent years, the improvement of spectral efficiency is required. One of effective technologies for improving the spectral efficiency is a QAM (Quadrature Amplitude Modulation).

In order to apply the QAM to the radio communication, it is necessary to compensate a fading distortion of a transmission signal generated under the Rayleigh fading environment.

As a method, conventionally known, for compensating such a fading distortion, there is, for example, "Rayleigh Fading Compensation Method for 16QAM MODEM in Digital Land Mobile Radio Systems" (SAMPEI, Technical Report of IEICE B-II, Vol. J-72-B-II, No. 1, pp. 7–15, January, 1989).

This method relates a system in which a transmission side transmits transmission data with a frame structure comprised of the predetermined number of symbols with a pilot symbol, known between the transmission and reception sides, inserted between data symbol sequences periodically, and the reception side detects a signal space position of the pilot symbol, and estimates a fading distortion amount of each symbol from the relationship between the relative position of each point to compensate.

This method uses the characteristic of the radio communication that the scale and gradient of a signal space diagram varies depending on an amplitude variation and phase variation of the transmission signal generated under the rayleigh fading environment, however the entire shape of the signal space diagram does not vary.

An example of conventional technologies using this system is explained below using accompanying drawings.

FIG. 1 is a block diagram illustrating a configuration of a conventional distortion compensation apparatus.

The distortion compensation apparatus in FIG. 1 is mainly comprised of clock reproduction section 11, pilot detection section 12, pilot symbol extraction section 13, distortion amount calculation section 14, data symbol extraction section 15, data delay section 16 and distortion estimation compensation section 17.

In the distortion compensation apparatus in FIG. 1, a received complex baseband signal u(t) is inputted to clock reproduction section 11, pilot detection section 12, pilot symbol extraction section 13, and data symbol extraction section 15.

Clock reproduction section 11 controls a clock signal oscillated from an internal oscillator based on the received complex baseband signal u(t), and outputs the controlled clock signal to pilot detection section 12 and data symbol extraction section 15.

Pilot detection section 12 detects a position of the pilot symbol in the received complex baseband signal u(t) based on the clock signal, and outputs a signal indicative of the position of the pilot symbol to pilot symbol extraction section 13.

Pilot symbol extraction section 13 extracts the pilot symbol from the received complex baseband signal u(t) at the same timing when a signal is inputted from pilot detection section 12, and outputs the extracted pilot symbol to distortion amount calculation section 14.

Herein, when it is assumed that a transmission complex baseband signal is z(t), and that a fading distortion is c(t), the received complex baseband signal u(t) can be expressed with the equation (1) shown below.

$$U(t)=z(t)\times c(t) \tag{1}$$

Further, when it is assumed that a received pilot symbol is $u_p$, and that a transmission pilot symbol is $t_p$, a fading distortion amount $c_p$ of the pilot symbol can be obtained with the equation (2) shown below.

$$c_p=u_p/t_p \tag{2}$$

Distortion amount calculation section 14 calculates fading distortion amount $c_p$ of the pilot symbol with the above equation (2) to output to distortion estimation compensation section 17.

Data symbol extraction section 15 extracts a data symbol from the received complex baseband signal u(t) based on the clock signal to output to data delay section 16.

Data delay section 16 delays the inputted data symbol by a time required in distortion estimation compensation section 17 for estimating the fading distortion amount of the data symbol to output to fading distortion estimation compensation section 17.

Distortion estimation compensation section 17 interpolates the fading distortion amount of the data symbol on the time axis based on fading distortion amount $c_p$ of the pilot symbol to estimate. Then, distortion estimation compensation section 17 multiplies the data symbol by a reciprocal (complex conjugate) of the fading distortion amount of the data symbol to compensate the fading distortion of the data symbol.

FIG. 2 is a diagram showing a relationship between time (abscissa) and distortion amount of each symbol (ordinate). As illustrated in FIG. 2, approximate polynomial 21 is determined based on the fading distortion amount of the pilot symbol (○), and fading distortion amount of each data symbol (●) is placed on approximate polynomial 21. In addition, FIG. 2 adopts the frame structure in which the pilot symbol is inserted periodically every 8 symbols.

Thus, the above-described conventional distortion apparatus performs the interpolation based on the fading distortion amount of the pilot symbol, and thereby estimates the fading distortion amount of the data symbol to compensate.

As the causes of the distortion generated in the transmission signal in radio communications, there is a frequency offset between a transmitter and receiver besides the fading.

However, in the above-described conventional distortion compensation apparatus, since the frequency offset is not considered, the estimation accuracy lowers in the case where the frequency offset is large, resulting in the problem that the bit error rate characteristic deteriorates.

SUMMARY OF THE INVENTION

A first object of the present invention is to estimate a frequency offset and fading distortion with high accuracy even in the case where the frequency offset between a transmitter and receiver is large, and to suppress the deterioration of the bit error rate characteristic.

The above object of the present invention is achieved by calculating an amplitude variation amount of data symbol and phase variation mount of the data symbol separately, or estimating a fading distortion of the data symbol using the pilot symbol subjected to frequency offset compensation.

Further, a second object of the present invention is to obtain excellent bit error rate characteristic even in the case where the fading variation is large, and a signal with low received field strength is received.

The above object of the present invention is achieved by judging whether or not the pilot symbol was detected effectively, and calculating the frequency offset using only the effectively detected pilot symbol.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Figure 1:
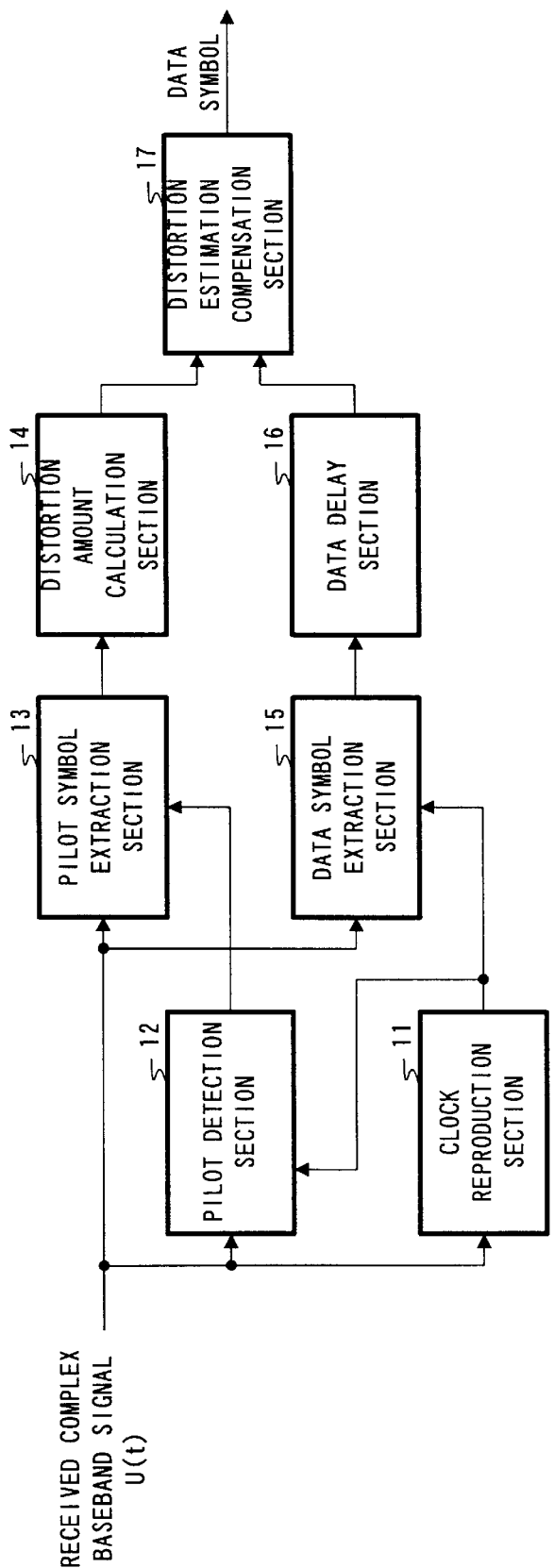
FIG. 1 is a block diagram illustrating a configuration of a conventional distortion compensation apparatus.
Figure 2:
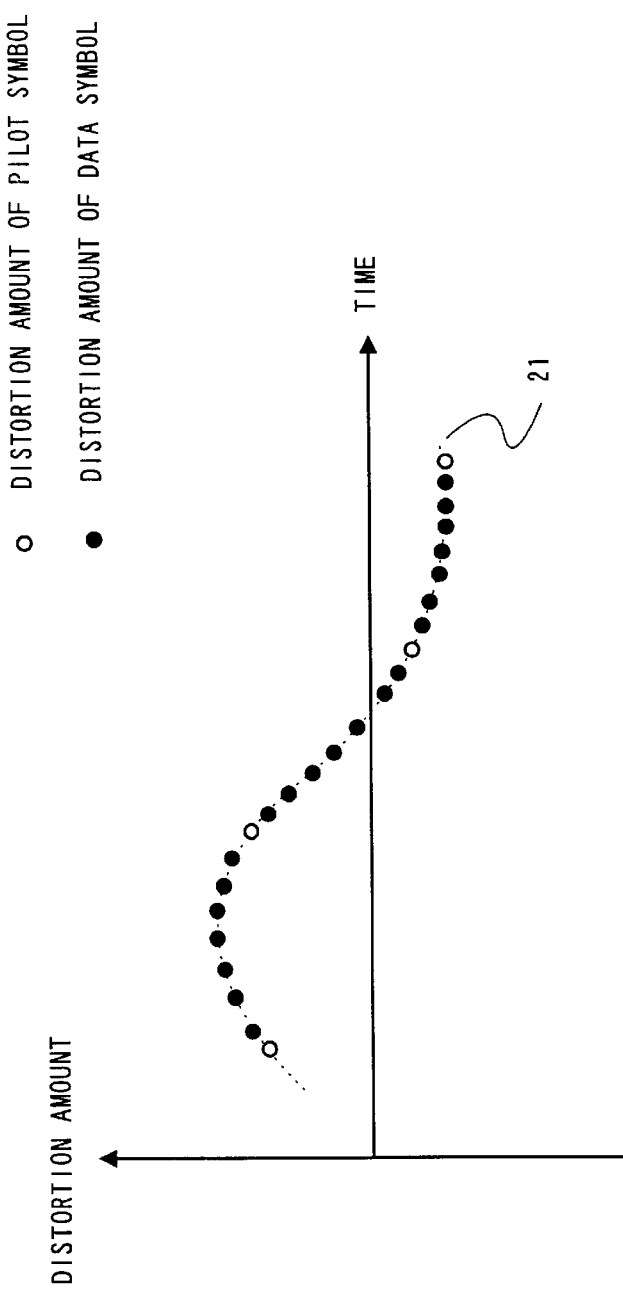
FIG. 2 is a diagram illustrating a concept of an interpolation to perform a conventional distortion compensation.
Figure 3:
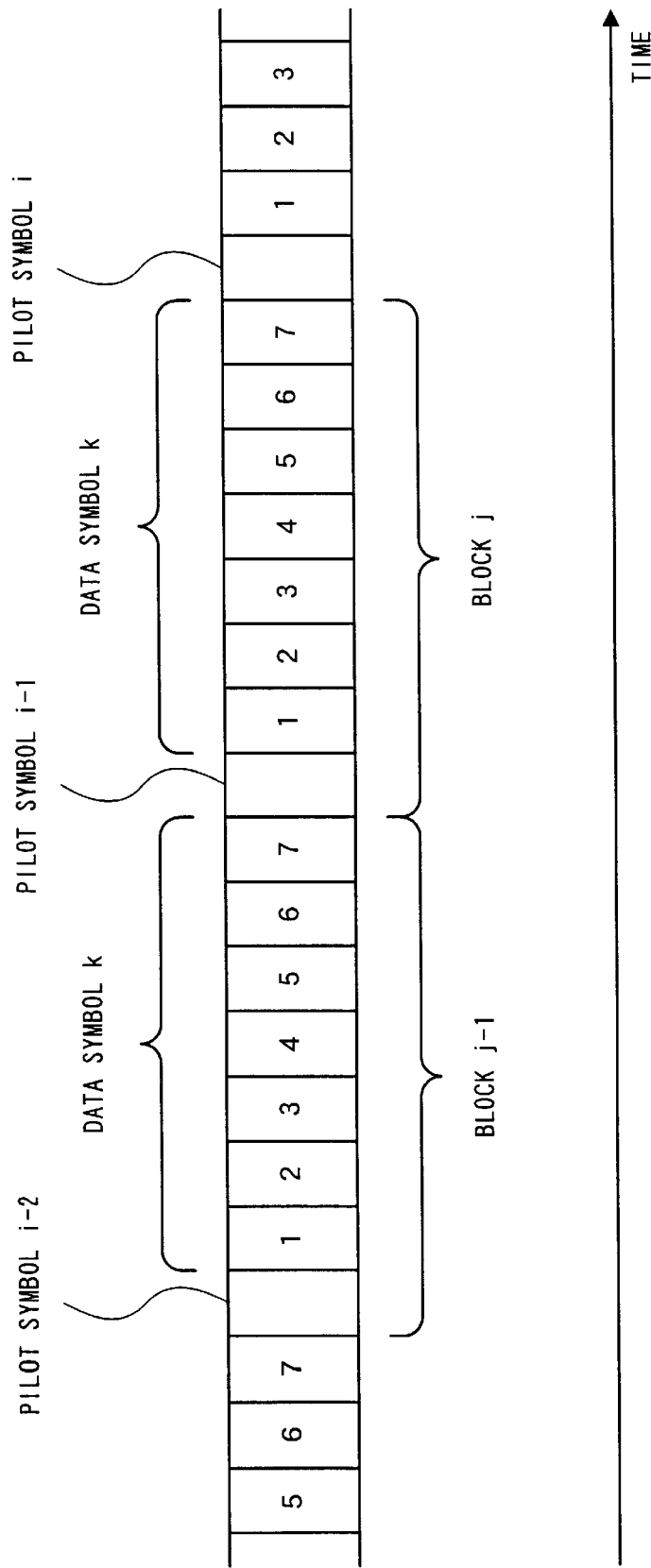
FIG. 3 is a diagram illustrating a frame structure of a received signal received at a reception apparatus according to each embodiment of the present invention.

Embodiments of the present invention will be described specifically below with reference to drawings. In addition, in the following explanation, a single carrier system is used as a communication system. Further, in the following explanation, it is assumed that as illustrated in FIG. 3, in the frame structure of a received signal, 1 block has 8 symbols, and the first 1 symbol of each block is a pilot symbol. Furthermore, it is assumed that as a polynomial approximation for use in an interpolation, the first-order Gaussian polynomial approximation is used.

First Embodiment

Figure 4:
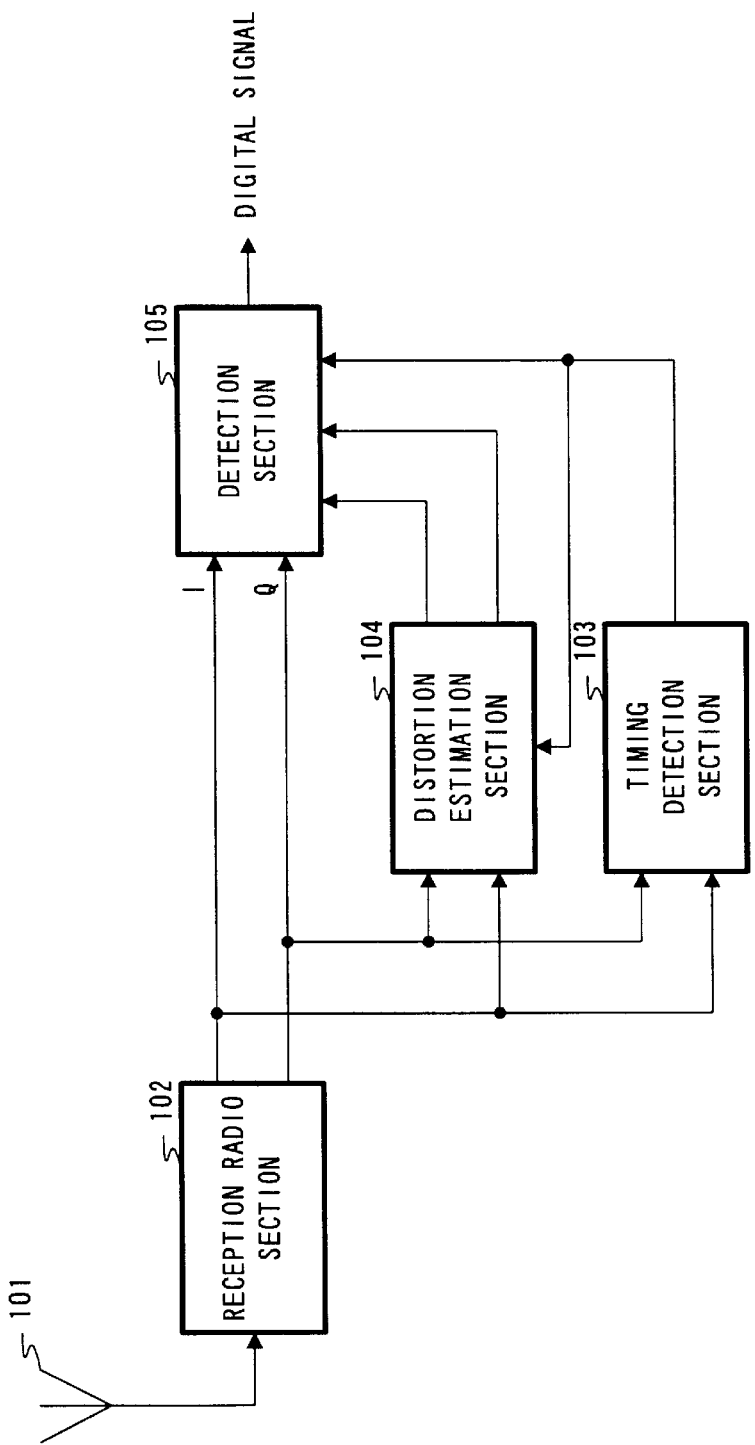
FIG. 4 is a block diagram illustrating a configuration of a reception apparatus according to a first embodiment of the present invention.

FIG. 4 is a block diagram illustrating a configuration of a reception apparatus according to the first embodiment of the present invention. The reception apparatus illustrated in FIG. 4 is mainly comprised of antenna 101, reception radio section 102, timing detection section 103, distortion estimation section 104 according to the first embodiment, and detection section 105.

In the reception apparatus illustrated in FIG. 4, a signal received at antenna 101 is inputted to reception radio section 102. Reception radio section 102 executes quadrature demodulation on the inputted signal, and outputs an in-phase component and quadrature component of a received quadrature baseband signal to timing detection section 103, distortion estimation apparatus 104 and detection section 105.

Timing detection section 103 acquires frame-symbol synchronization based on the in-phase component and quadrature component of the received quadrature baseband signal, and outputs a timing signal indicative of a head of a frame-symbol to distortion estimation apparatus 104 and detection section 105.

Distortion estimation apparatus 104 receives the inputted in-phase component and quadrature component of the received quadrature baseband signal and timing signal, estimates an amplitude variation amount and phase variation amount as described later, and outputs the estimated results to detection section 105.

Detection section 105 executes detection processing on the in-phase component and quadrature component of the received quadrature baseband signal using the amplitude variation amount and phase variation amount, and outputs a digital signal. In addition, as a method for using the amplitude variation amount and phase variation amount, for example, there are a method for varying a threshold for use in judgment in the detection processing based on the amplitude variation amount and phase variation amount, and another method for multiplying the in-phase component and quadrature component of the received quadrature baseband signal by inverse properties of the amplitude variation amount and phase variation amount.

Figure 5:
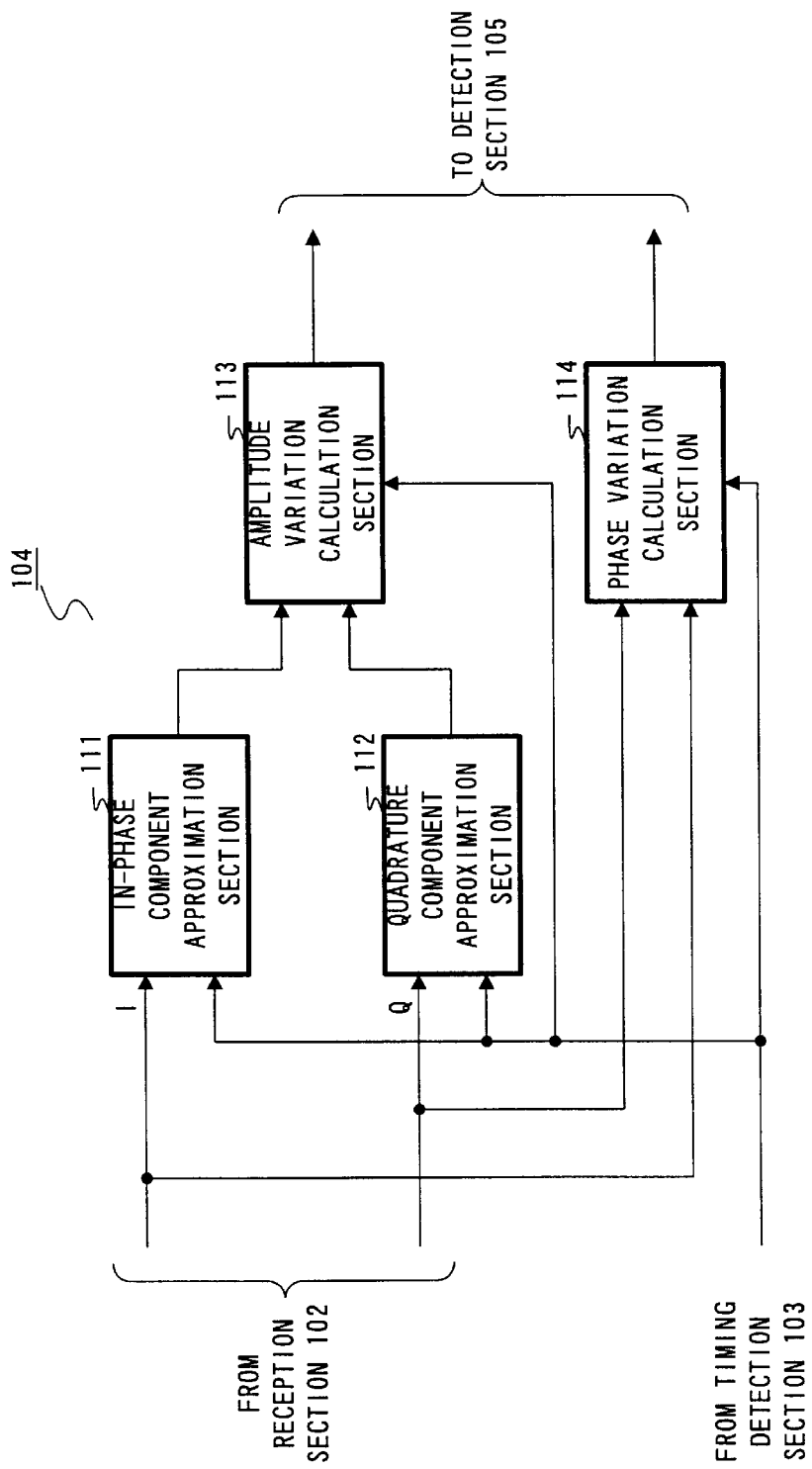
FIG. 5 is a block diagram illustrating a configuration of a distortion estimation apparatus according to the first embodiment of the present invention.

FIG. 5 is a block diagram illustrating an internal configuration of a distortion estimation apparatus according to this embodiment. Distortion estimation apparatus 104 illustrated in FIG. 5 is mainly comprised of in-phase component approximation section 111, quadrature component approximation section 112, amplitude variation calculation section 113, and phase variation calculation section 114.

In-phase component approximation section 111 receives the inputted in-phase component of the received quadrature baseband signal and timing signal, and calculates the amplitude variation amount of the in-phase component of the data symbol from that of the in-phase component of the pilot symbol approximately. For example, in FIG. 3, amplitude variation amount $r_k$ of the in-phase component of data symbol k (k=1 to 7) of block j is calculated from in-phase component $I_i$ of pilot symbol i and in-phase component $I_{i-1}$ of pilot symbol i−1 with the equation (3) shown below.

$$r_k = k \times \frac{I_i}{8} + \left(1 - \frac{k}{8}\right) \times I_{i-1} \qquad (3)$$

Then, in-phase component approximation section 111 outputs a signal indicative of amplitude variation amount $r_k$ of the in-phase component of the data symbol calculated with the above equation (3) to amplitude variation calculation section 113.

Quadrature component approximation section 112 receives the inputted quadrature component of the received quadrature baseband signal and timing signal, and calculates the amplitude variation amount of the quadrature component of the data symbol from that of the quadrature component of the pilot symbol approximately. For example, in FIG. 3, amplitude variation amount $s_k$ of the quadrature component of data symbol k (k=1 to 7) of block j is calculated from quadrature component $Q_i$ of pilot symbol i and quadrature component $Q_{i-1}$ of pilot symbol i−1 with the equation (4) shown below.

$$s_k = k \times \frac{Q_i}{8} + \left(1 - \frac{k}{8}\right) \times Q_{i-1} \qquad (4)$$

Then, quadrature component approximation section 112 outputs a signal indicative of amplitude variation amount $s_k$ of the quadrature component of the data symbol calculated with the above equation (4) to amplitude variation calculation section 113.

Amplitude variation calculation section 113 calculates the amplitude variation amount of each data symbol from the amplitude variation amounts of the in-phase component and quadrature component of each data symbol. For example, in FIG. 3, amplitude variation amount $A_k$ of data symbol k (k=1 to 7) of block j is calculated using amplitude variation amount $r_k$ of the in-phase component and amplitude variation amount $s_k$ of the quadrature component with the equation (5) shown below.

$$A_k = \sqrt{r_k^2 + s_k^2} \qquad (5)$$

Then, amplitude variation calculation section 113 outputs a signal indicative of the amplitude variation amount of the data symbol calculated with the above equation (5) to detection section 105.

Phase variation calculation section 114 receives the inputted in-phase component and quadrature component of the received quadrature baseband signal and timing signal, and calculates the phase variation amount of the data symbol based on the phase variation amount of the pilot symbol approximately. For example, in FIG. 3, phase variation amount $\theta_k$ of the data symbol k (k=1 to 7) of block j is calculated from in-phase component $I_i$ of pilot symbol i, in-phase component $I_{i-1}$ of pilot symbol i−1, quadrature component $Q_i$ of pilot symbol i and quadrature component $Q_{i-1}$ of pilot symbol i−1 with the equation (6) shown below.

$$\theta_k = \frac{k}{8}\tan^{-1}\left(\frac{Q_i}{I_i}\right) + \left(1 - \frac{k}{8}\right)\tan^{-1}\left(\frac{Q_{i-1}}{I_{i-1}}\right) \qquad (6)$$

In addition, phase variation amount $\theta_k$ calculated with the above equation (6) is a value including a phase variation amount caused by the fading and another phase variation amount caused by the frequency offset.

Then, phase variation calculation section 114 outputs a signal indicative of phase variation amount $\theta_k$ of the data symbol calculated with the above equation (6) to detection section 105.

Thus, by calculating the amplitude variation amount of the data symbol and the phase variation amount of the data symbol separately, it is possible to estimate the frequency offset between a transmitter and receiver and the fading distortion both with high accuracy.

Then, as illustrated in FIG. 4, by installing the above-described distortion estimation apparatus in a reception apparatus, since it is possible to estimate the frequency offset between a transmitter and receiver and the fading distortion both with high accuracy to detect, it is possible to suppress the deterioration of the bit error rate characteristic.

Second Embodiment

Figure 6:
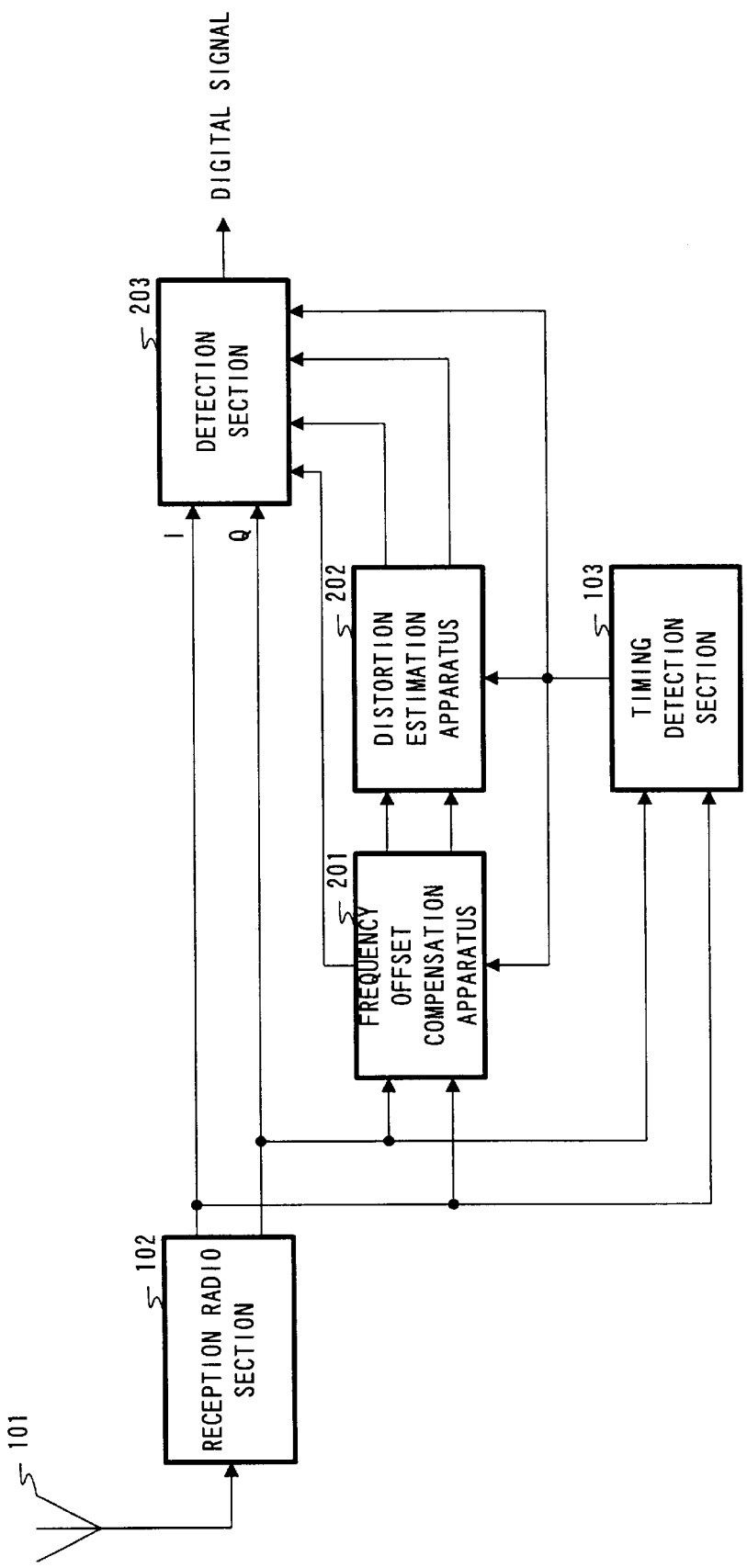
FIG. 6 is a block diagram illustrating a configuration of a reception apparatus according to a second embodiment of the present invention.

FIG. 6 is a block diagram illustrating a configuration of a reception apparatus according to the second embodiment of the present invention. In addition, in the reception apparatus in FIG. 6, the components having the function common to that in the reception apparatus illustrated in FIG. 4 are given the same symbols as in FIG. 4, and the explanations thereof are omitted.

The reception apparatus in FIG. 6 adopts a configuration in which frequency offset compensation apparatus 200 is added to the reception apparatus in FIG. 4. In addition, in the reception apparatus in FIG. 6, the functions of distortion estimation apparatus 202 and detection section 203 are different from those of distortion estimation apparatus 104 and detection section 105 of the reception apparatus in FIG. 4.

Figure 7:
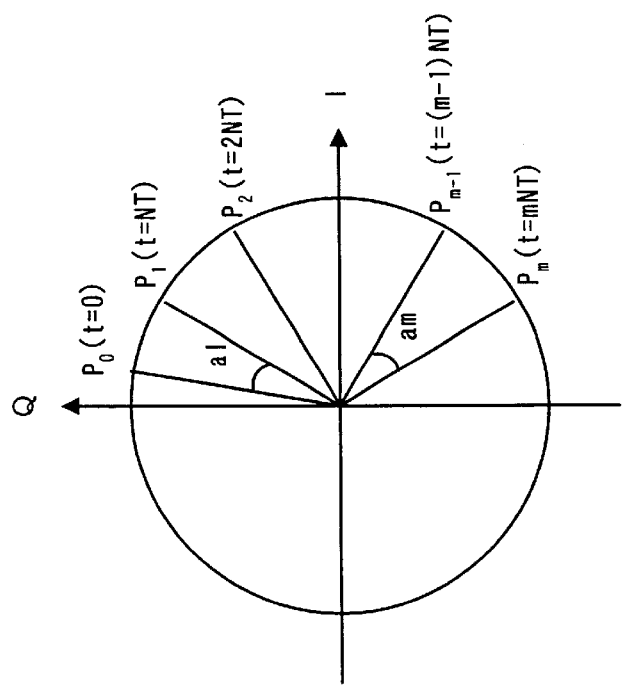
FIG. 7 is a conceptual diagram illustrating a time change of a phase of a pilot symbol in a frequency offset compensation.

FIG.7 is a diagram illustrating a time change of a phase of a pilot symbol on the complex plane. As illustrated in FIG. 7, at time t=mNT (m is a natural number, N is an insertion interval of a pilot symbol, and T is a symbol period), when it is assumed that a phase variation amount between a pilot symbol and a previous pilot symbol just before is am, in the case where the frequency offset is present, each pilot symbol (P0, P1, P2, . . . , Pm−1, Pm, Pm+1 . . . ) rotates to a constant direction on the complex plane by a rotation amount proportional to a frequency offset amount.

Frequency offset compensation apparatus 201 receives the inputted in-phase component and quadrature component of the received quadrature baseband signal and timing signal, and extracts the pilot symbol. Then, frequency offset compensation apparatus 201 calculates the phase variation amount between the pilot symbols to calculate the frequency offset amount, and compensates the frequency offset of the pilot symbol by inversely rotating the phase of the pilot symbol by the calculated frequency offset amount.

Then, frequency offset compensation apparatus 201 outputs the in-phase component and quadrature component of the pilot symbol subjected to the frequency offset compensation to distortion estimation apparatus 202, and further outputs the estimated frequency offset amount to detection section 203. In addition, the detailed internal configuration of frequency offset compensation apparatus 201 is described later.

Distortion estimation apparatus 202 receives the inputted in-phase component and quadrature component of the received quadrature baseband signal and timing signal, estimates the amplitude variation amounts of the in-phase component and quadrature component of the pilot symbol as described later, and outputs the estimated results to detection section 203.

Detection section 203 executes detection processing on the in-phase component and quadrature component of the received quadrature baseband signal using the frequency offset amount and the amplitude variation amount of the pilot symbol, and outputs a digital signal. As a method for using the frequency offset amount and the amplitude variation amount of the pilot symbol, for example, there are a method for varying a threshold for use in judgment in the detection processing based on the frequency offset amount and the amplitude variation amount of the pilot symbol, and another method for multiplying the in-phase component and quadrature component of the received quadrature baseband signal by inverse properties of the frequency offset amount and the amplitude variation amount of the pilot symbol.

Figure 8:
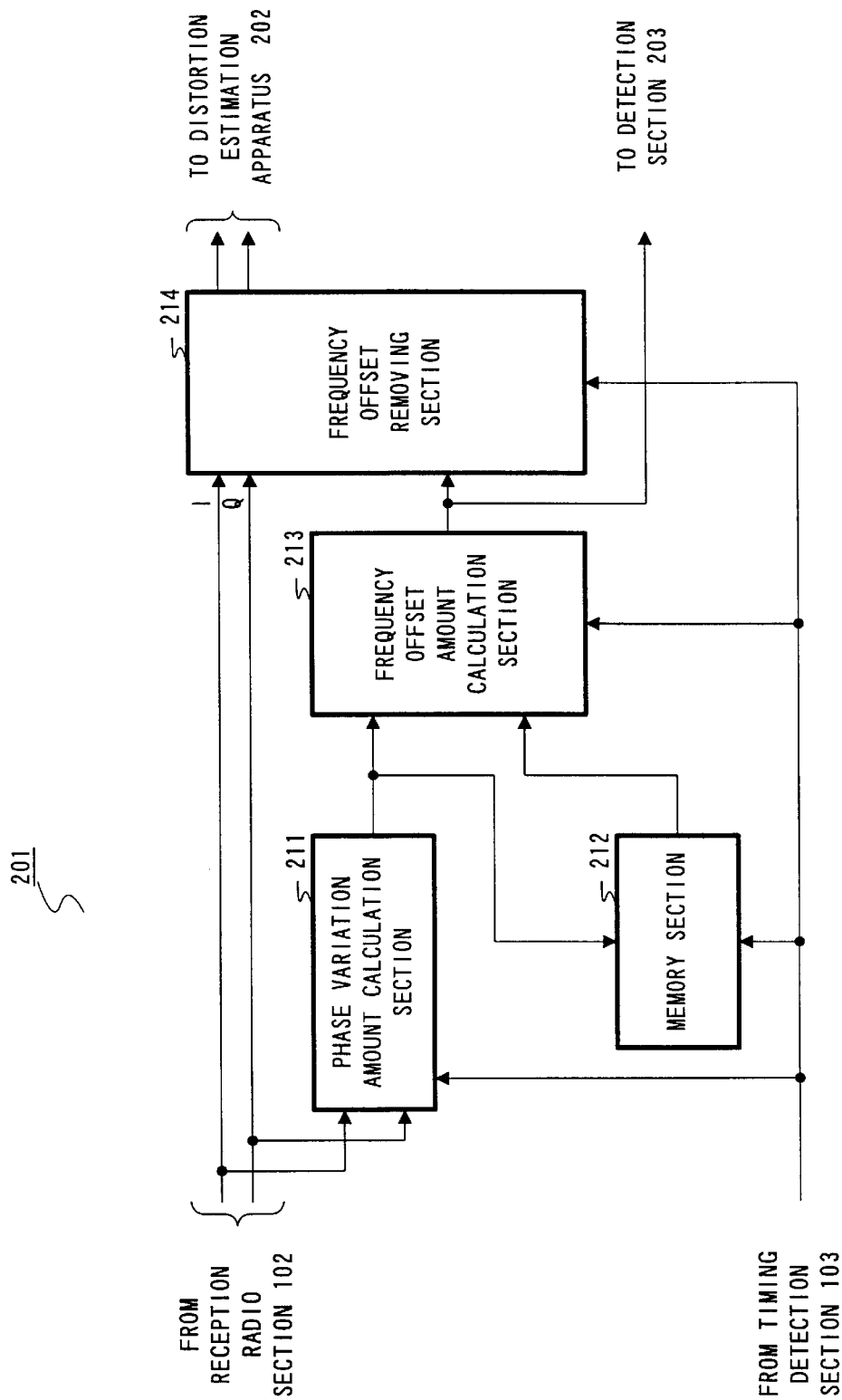
FIG. 8 is a diagram illustrating a configuration of a frequency offset compensation apparatus according to a second embodiment.

The internal configuration of frequency offset compensation apparatus 201 of the distortion estimation apparatus according to this embodiment is next explained using a block diagram in FIG. 8.

Frequency offset compensation apparatus 201 is mainly comprised of phase variation amount calculation section 211, memory section 212, frequency offset calculation section 213, and frequency offset removing section 214.

Phase variation amount calculation section 211 receives the inputted in-phase component and quadrature component of the received quadrature baseband signal and timing signal, extracts the pilot symbol, and obtains phase variation amount $\theta_i$ between the pilot symbols from in-phase component $I_i$ of pilot symbol i, in-phase component $I_{i-1}$ of pilot symbol i-1, quadrature component $Q_i$ of pilot symbol i and quadrature component $Q_{i-1}$ of pilot symbol i-1 with the equation (7) shown below. Then, phase variation amount calculation section 211 outputs a signal indicative of phase variation amount $\theta_i$ to memory section 212 and frequency offset calculation section 213.

$$\theta_k = \frac{k}{8}\tan^{-1}\left(\frac{Q_i}{I_i}\right) + \left(1 - \frac{k}{8}\right)\tan^{-1}\left(\frac{Q_{i-1}}{I_{i-1}}\right) \quad \Lambda \ (7)$$

Memory section 212 holds the inputted phase variation amount $\theta_i$, and according to the timing signal, outputs phase variation amount $\theta_{i-1}$ already held.

Frequency offset calculation section 213 calculates the frequency offset amount using, for example, phase variation amount $\theta_i$ and phase variation amount $\theta_{i-1}$, and outputs a signal indicative of the frequency offset amount to detection section 203 and frequency offset removing section 214. In addition, the frequency offset amount is generally obtained by averaging a plurality of phase variation amounts obtained previously.

Frequency offset removing section 214 receives the inputted in-phase component and quadrature component of the received quadrature baseband signal, timing signal and the signal indicative of the frequency offset amount, extracts the pilot symbol, removes the frequency offset amount from the in-phase component and quadrature component of the pilot symbol to compensate, and outputs the in-phase component and quadrature component of the pilot symbol subjected to the frequency offset compensation to distortion estimation apparatus 202.

Figure 9:
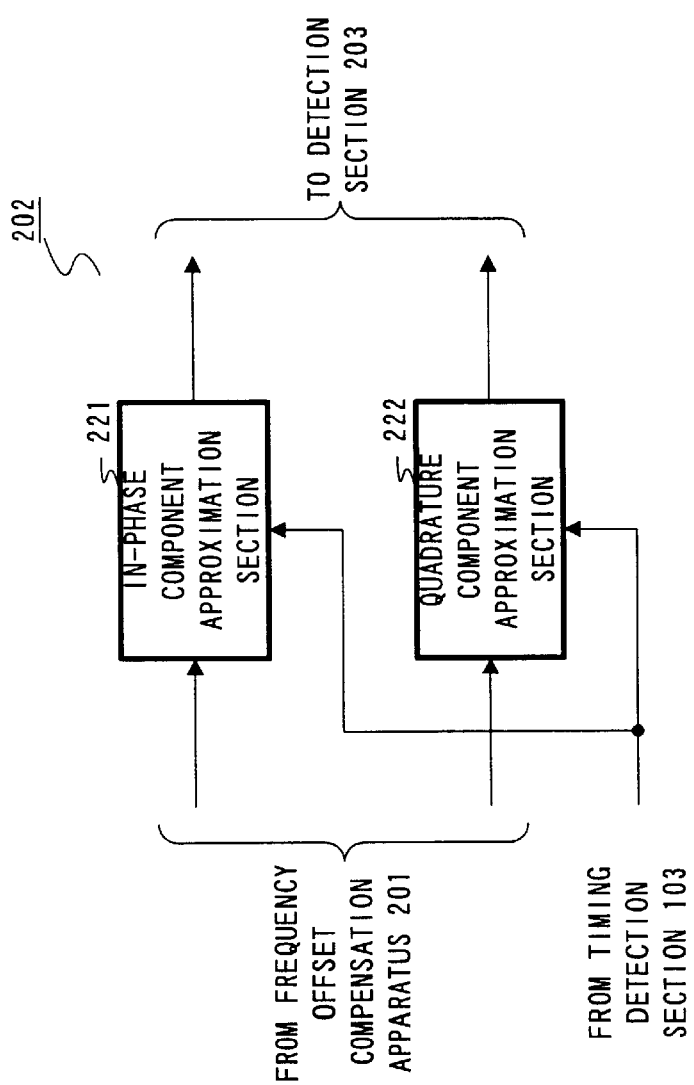
FIG. 9 is a block diagram illustrating a configuration of a distortion estimation apparatus according to the second embodiment of the present invention.

The internal configuration of distortion estimation apparatus 202 according to this embodiment is next explained using a block diagram in FIG. 9.

Distortion estimation apparatus 202 is mainly comprised of in-phase component approximation section 221, and quadrature component approximation section 222.

In-phase component approximation section 221 receives the inputted in-phase component of the pilot symbol subjected to the frequency offset compensation and timing signal, and calculates the fading distortion amount of the in-phase component of the data symbol approximately. For example, in FIG. 3 previously described, fading distortion amount $r_k$ of the in-phase component of symbol k (k=1 to 7) of block j of data symbols is calculated from in-phase component $I_i$ of pilot symbol i and in-phase component $I_{i-1}$ of pilot symbol i-1 with the equation (8) shown below.

$$r_k = k \times \frac{I_i}{8} + \left(1 - \frac{k}{8}\right) \times I_{i-1} \quad \Lambda \ (8)$$

Then, in-phase component approximation section 221 outputs a signal indicative of fading distortion amount $r_k$ of the in-phase component of the data symbol calculated to detection section 203.

Quadrature component approximation section 222 receives the inputted quadrature component of the pilot symbol subjected to the frequency offset compensation and timing signal, and calculates the fading distortion amount of the quadrature component of the data symbol approximately. For example, in FIG. 3, fading distortion amount $s_k$ of the quadrature component of symbol k (k=1 to 7) of block j of data symbols is calculated from quadrature component $Q_i$ of pilot symbol i and quadrature component $Q_{i-1}$ of pilot symbol i-1 with the equation (9) shown below.

$$s_k = k \times \frac{Q_i}{8} + \left(1 - \frac{k}{8}\right) \times Q_{i-1} \quad \Lambda \ (9)$$

Then, quadrature component approximation section 222 outputs a signal indicative of fading distortion amount $s_k$ of the quadrature component of the data symbol calculated to detection section 203.

Thus, by compensating the frequency offset of the pilot symbol, and estimating the fading distortion of the data symbol using the pilot symbol subjected to the frequency offset compensation, it is possible to estimate the frequency offset between a transmitter and receiver and the fading distortion with high accuracy.

Then, as illustrated in FIG. 6, by installing the above-described frequency offset compensation apparatus and distortion estimation apparatus in a reception apparatus, since it is possible to estimate the frequency offset between a transmitter and receiver and the fading distortion both with high accuracy to detect, it is possible to suppress the deterioration of the bit error rate characteristic.

Third Embodiment

When the received field strength is low due to, for example, fading, the estimated error of phase variation amount becomes large because effects of noise are increased.

Figure 10:
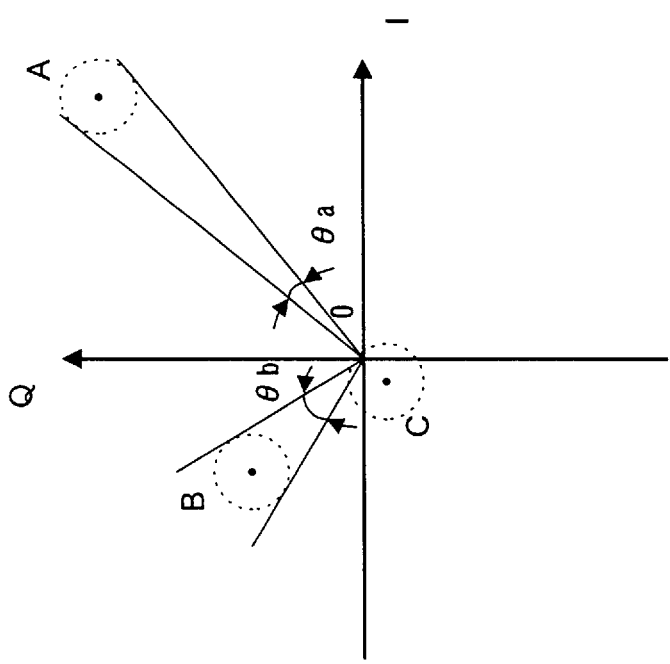
FIG. 10 is a conceptual diagram illustrating a relationship between received power and an estimated error of a phase variation amount.

For example, in FIG. 10, it is assumed that signal A with high received field strength and signal B with low received field strength each moves in a range of a circle with broken lines due to the effects of noise. As can be seen from FIG. 10, error $\theta_b$ of phase rotation angle relating to signal B is larger than error $\theta_a$ of phase rotation angle relating to signal A. Further, with respect to signal C with extremely low received field strength, by the effects of noise, the quadrant on which signal C is present changes, and therefore it is not possible to estimate the phase rotation angle correctly.

When the frequency offset amount is estimated using a signal with low field strength, the bit error rate characteristic deteriorates because the estimated error becomes large.

The third embodiment of the present invention is obtained to solve the above problem, and in this embodiment, excellent bit error rate characteristic can be obtained even in the case where the fading variation is large, and a signal with low field strength is received.

Figure 11:
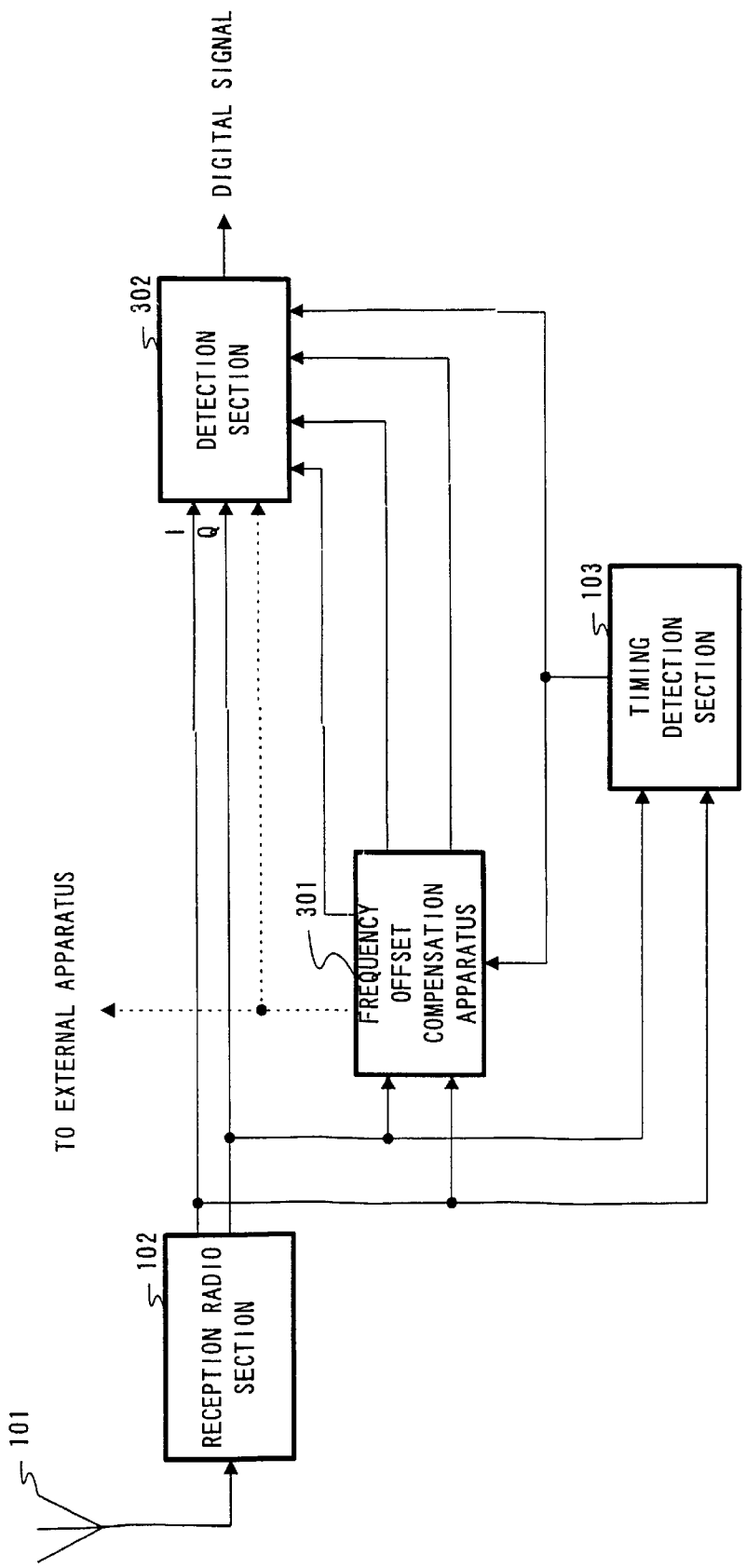
FIG. 11 is a block diagram illustrating a configuration of a reception apparatus according to a third embodiment of the present invention.

FIG. 11 is a block diagram illustrating a configuration of a reception apparatus according to the third embodiment of the present invention. In addition, in the reception apparatus in FIG. 11, the components having the function common to that in the reception apparatus illustrated in FIG. 6 are given the same symbols as in FIG. 6, and the explanations thereof are omitted.

In the reception apparatus in FIG. 11, the functions of frequency offset compensation apparatus 301 and detection section 302 are different from those of frequency offset compensation apparatus 201 and detection section 203 of the reception apparatus illustrated in FIG. 6. In addition, the reception apparatus in FIG. 11 adopts a configuration in which distortion estimation apparatus 202 is eliminated as compared the reception apparatus illustrated in FIG. 6.

Frequency offset compensation apparatus 301 receives the inputted in-phase component and quadrature component of the received quadrature baseband signal and timing signal, and extracts the pilot symbol. Then, frequency offset compensation apparatus 301 judges whether or not the pilot symbol was detected effectively, calculates a frequency offset amount using only the effectively detected pilot symbol, and compensates the frequency offset amount of the pilot symbol by inversely rotating the phase of the received quadrature baseband signal by the calculated frequency offset amount.

Then, frequency offset compensation apparatus 301 outputs the in-phase component and quadrature component of the pilot symbol subjected to the frequency offset compensation and estimated frequency offset amount to detection section 302.

Detection section 302 executes detection processing on the in-phase component and quadrature component of the received quadrature baseband signal using the frequency offset amount, and outputs a digital signal. As a method for using the frequency offset amount, for example, there are a method for varying a threshold for use in judgment in the detection processing based on the frequency offset amount, and another method for multiplying the in-phase component and quadrature component of the received quadrature baseband signal by an inverse property of the frequency offset amount.

Figure 12:
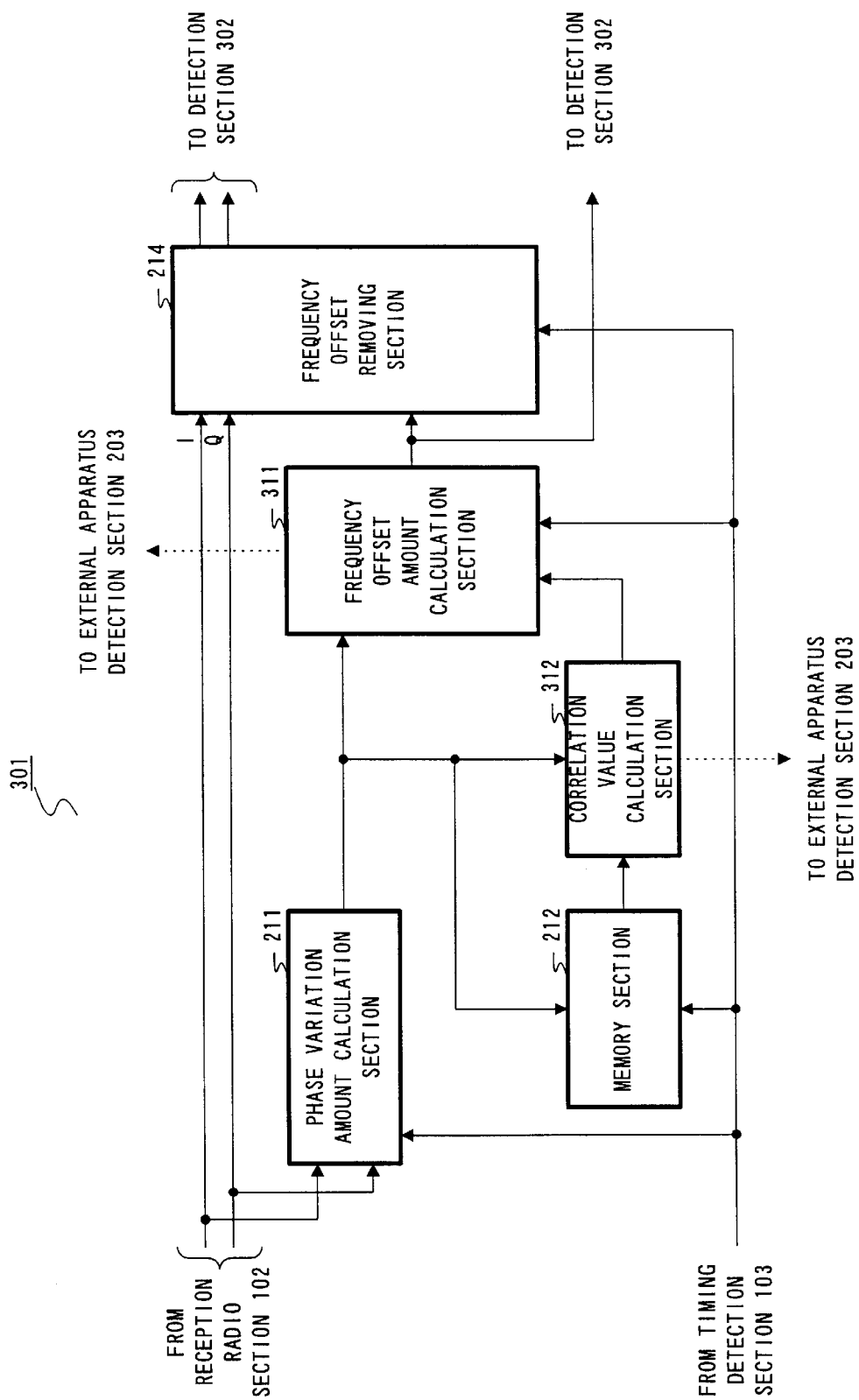
FIG. 12 is a diagram illustrating a configuration of a frequency offset compensation apparatus according to the third embodiment.

FIG. 12 is a block diagram illustrating an internal configuration of frequency offset compensation apparatus 301. In frequency offset compensation apparatus 301 in FIG. 12, the function of frequency offset amount calculation section 311 is different from that of frequency offset amount calculation section 213 in frequency offset compensation apparatus 201 illustrated in FIG. 8. Further, frequency offset compensation apparatus 301 in FIG. 12 adopts a configuration in which correlation value calculation section 312 is added as compared to frequency offset compensation apparatus 201 illustrated in FIG. 8.

Correlation value calculation section 312 receives phase variation amount $\theta_i$ inputted from phase variation calculation amount section 211 and phase variation amount $\theta_{i-1}$ inputted from memory section 212, and calculates the correlation value indicative of the correlation between phase variation amount $\theta_i$ and phase variation amount $\theta_{i-1}$ (for example, an absolute value of a value obtained by subtracting phase variation amount $\theta_{i-1}$ from phase variation amount $\theta_i$) to output to frequency offset amount calculation section 311.

Based on the correlation value, frequency offset amount calculation section 311 judges whether or not there is the correlation between phase variation amount θi and phase variation amount θi−1 in other words, whether or not pilot symbol i was effectively detected. For example, in the case where the correlation value is equal to or less than a predetermined threshold, it is judged that there is the correlation between phase variation amount θi and phase variation amount θi−1, and that pilot symbol i was effectively detected.

Then, frequency offset amount calculation section 311 calculates the frequency offset amount using phase variation amount θi when judges that there is the correlation between phase variation amount θi and phase variation amount θi−1, while calculating the frequency offset amount without using phase variation amount θi when judges that there is not the correlation between phase variation amount θi and phase variation amount θi−1.

In addition, it may be possible that frequency offset amount calculation section 311 outputs a signal indicative of a judgement result on whether or not there is the correlation between phase variation amount θi and phase variation amount θi−1 (hereinafter referred to as "correlation result signal") to an external apparatus such as a CPU not shown in the figure. In this case, based on the content of the correlation result signal, the external apparatus may perform an judgement of data effectiveness and judgment of channel switch such as diversity and handover.

Further, it may be possible that correlation value calculation section 312 outputs a signal indicative of the correlation value between phase variation amount θi and phase variation amount θi−1 (hereinafter referred to as "correlation value signal") to detection section 203, and that detection section 203 judges whether or not there is the correlation between phase variation amount θi and phase variation amount θi−1.

Furthermore, it may be possible that correlation value calculation section 312 outputs the correlation value signal to an external apparatus such as a CPU not shown in the figure, and that the external apparatus such as the CPU judges whether or not there is the correlation between phase variation amount θi and phase variation amount θi−1, and based on the judgement result, performs an judgement of data effectiveness and judgment of channel switch such as diversity and handover. In this case, phase variation amount calculation section 211, memory section 212 and correlation value calculation section 312 function as the control apparatus to calculate the correlation value.

Thus, by judging whether or not the pilot symbol was detected effectively, and calculating the frequency offset amount of the pilot symbol using only the effectively detected pilot symbol, it is possible to obtain excellent bit error rate characteristic even in the case where the fading variation is large, and the signal with low received field strength is received.

Fourth Embodiment

The fourth embodiment of the present invention is obtained by combining the second embodiment and third embodiment, and in this embodiment in the case where a reception apparatus has a frequency offset compensation apparatus and distortion estimation apparatus installed therein, excellent bit error rate characteristic can be obtained even in the case where a fading variation is large, and a signal with low field strength is received.

Figure 13:
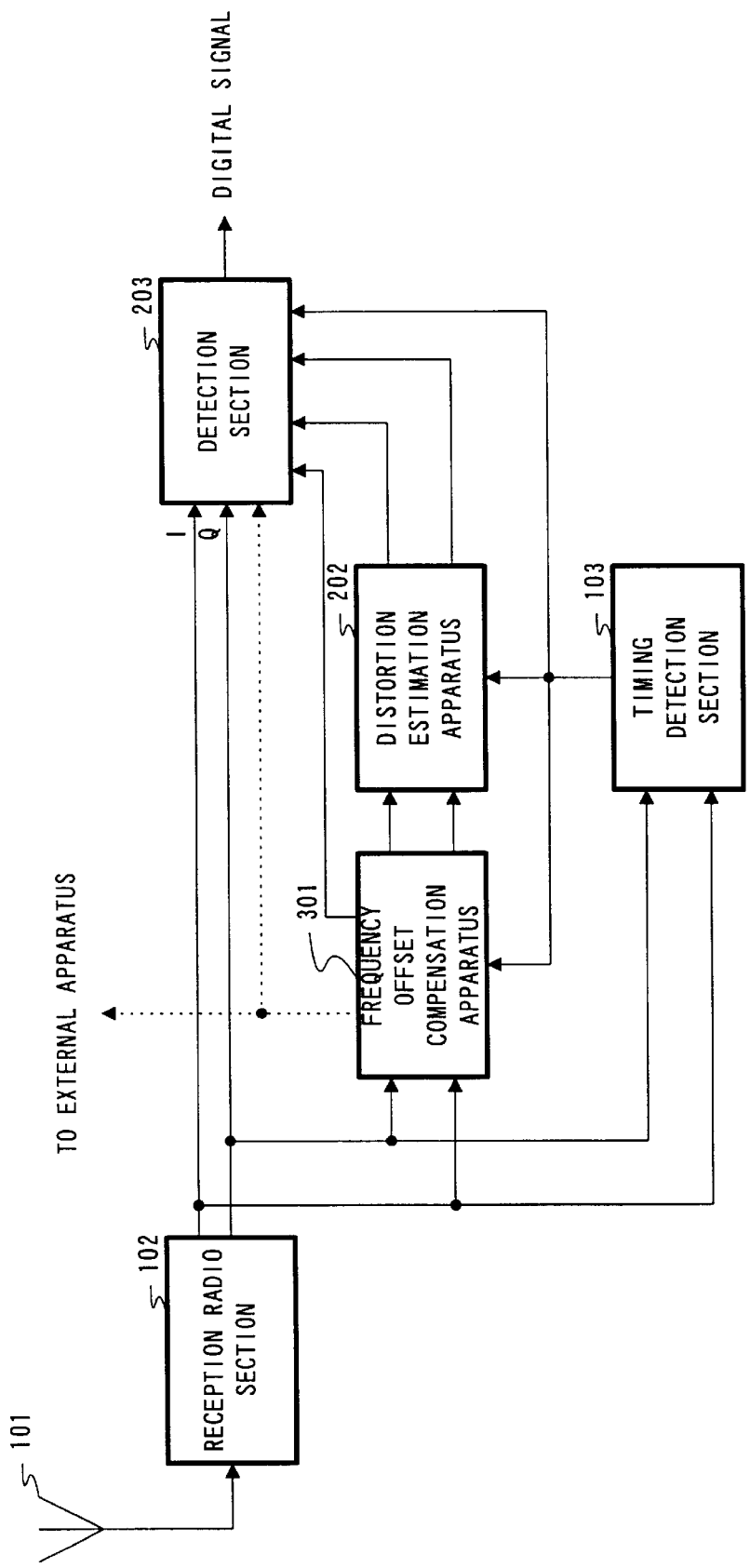
FIG. 13 is a block diagram illustrating a configuration of a reception apparatus according to a fourth embodiment of the present invention.

FIG. 13 is a block diagram illustrating a configuration of a reception apparatus according to the fourth embodiment of the present invention. In addition, in the reception apparatus in FIG. 13, the components having the function common to that in the reception apparatus illustrated in FIG. 6 are given the same symbols as in FIG. 6, and the explanations thereof are omitted.

The reception apparatus in FIG. 13 has frequency offset compensation apparatus 301 illustrated in FIG. 11 installed therein, instead of frequency offset compensation apparatus 201, as compared to the reception apparatus illustrated in FIG. 6.

Frequency offset compensation apparatus 301 receives the inputted in-phase component and quadrature component of the received quadrature baseband signal and timing signal, and extracts the pilot symbol. Then, frequency offset compensation apparatus 301 judges whether or not the pilot symbol was detected effectively, calculates a frequency offset amount using only the effectively detected pilot symbol, and compensates the frequency offset amount of the pilot symbol by inversely rotating the phase of the received quadrature baseband signal by the calculated frequency offset amount.

Then, frequency offset compensation apparatus 301 outputs the in-phase component and quadrature component of the pilot symbol subjected to the frequency offset compensation to distortion estimation apparatus 202, and further outputs the estimated frequency offset amount to detection section 203.

Detection section 203 executes detection processing on the in-phase component and quadrature component of the received quadrature baseband signal using the frequency offset amount and the amplitude variation amount of the pilot symbol, and outputs a digital signal.

Thus, by judging whether or not the pilot symbol was detected effectively, calculating the frequency offset amount of the pilot symbol using only the effectively detected pilot symbol to compensate the frequency offset of the pilot symbol, and estimating the fading distortion of the data symbol using the pilot symbol subjected to the frequency offset compensation, it is possible to obtain excellent bit error rate characteristic even in the case where the fading variation is large, and the signal with low received field strength is received, and further to estimate the frequency offset between a transmitter and receiver and fading distortion with high accuracy.

Fifth Embodiment

Figure 14:
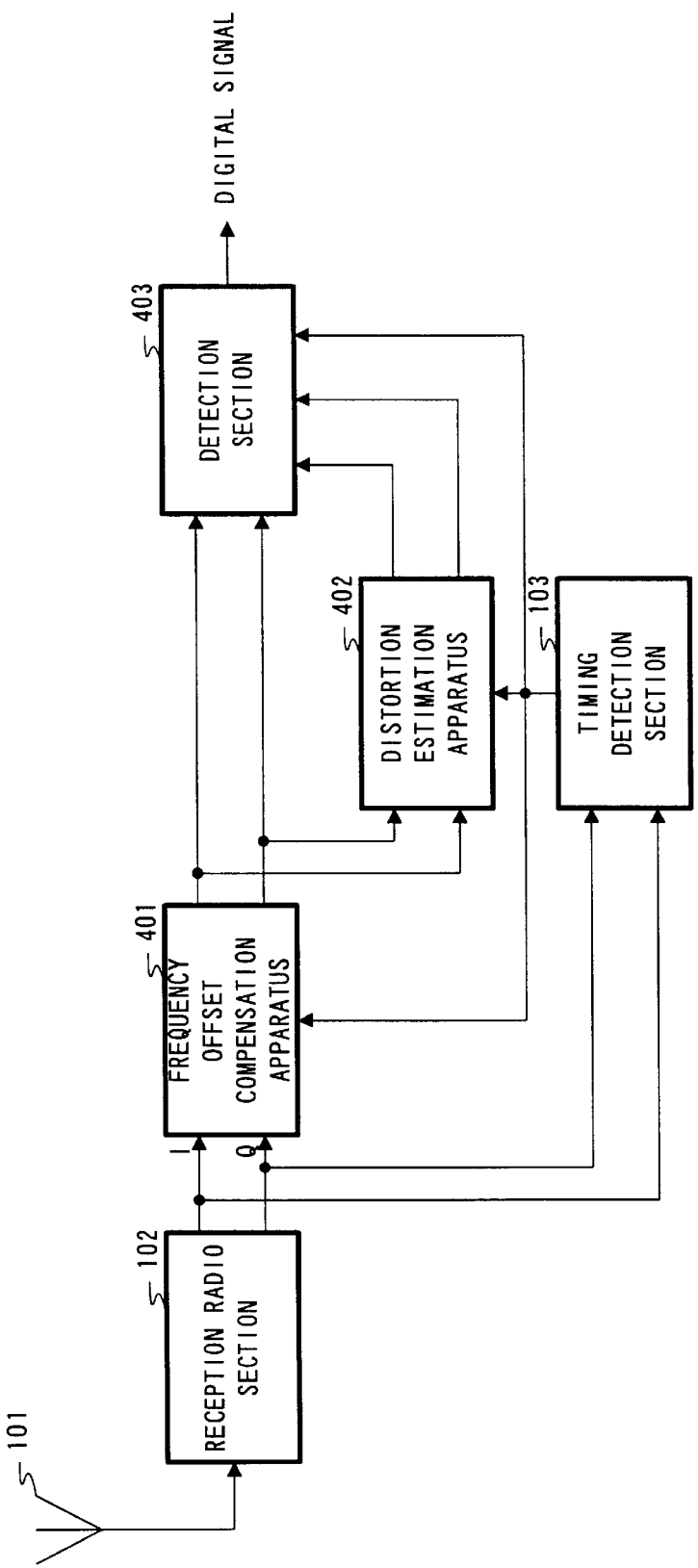
FIG. 14 is a block diagram illustrating a configuration of a reception apparatus according to a fifth embodiment of the present invention.

FIG. 14 is a block diagram illustrating a configuration of a reception apparatus according to the fifth embodiment of the present invention. In addition, in the reception apparatus in FIG. 14, the components having the function common to that in the reception apparatus illustrated in FIG. 6 are given the same symbols as in FIG. 6, and the explanations thereof are omitted.

In the reception apparatus in FIG. 14, the functions of frequency offset compensation apparatus 401, distortion estimation apparatus 402 and detection section 403 are different from those of frequency offset compensation apparatus 201, distortion estimation apparatus 202 and detection section 203 of the reception apparatus illustrated in FIG. 6.

Frequency offset compensation apparatus 401 receives the inputted in-phase component and quadrature component of the received quadrature baseband signal and timing signal, and extracts the pilot symbol. Then, frequency offset compensation apparatus 401 calculates the frequency offset amount of the pilot symbol, and estimates the frequency offset amount between data symbols by the interpolation. Then, frequency offset compensation apparatus 401 compensates the frequency offset of the received quadrature baseband signal by inversely rotating the phase of the received quadrature baseband signal by the calculated or estimated frequency offset amount.

Then, frequency offset compensation apparatus 401 outputs the in-phase component and quadrature component of the received quadrature baseband signal subjected to the frequency offset compensation to distortion estimation apparatus 402 and detection section 403. In addition, the detailed external configuration of frequency offset compensation apparatus 401 is described later.

Distortion estimation apparatus 402 receives the inputted in-phase component and quadrature component of the received quadrature baseband signal subjected to the frequency offset compensation and timing signal, estimates amplitude variation amounts of the in-phase component and quadrature component of the received quadrature baseband signal as described later, and outputs the estimated results to detection section 403.

Detection section 403 executes detection processing on the in-phase component and quadrature component of the received quadrature baseband signal subjected to the frequency offset compensation using the amplitude variation amounts of the in-phase component and quadrature component of the received quadrature baseband signal, and outputs a digital signal.

Figure 15:
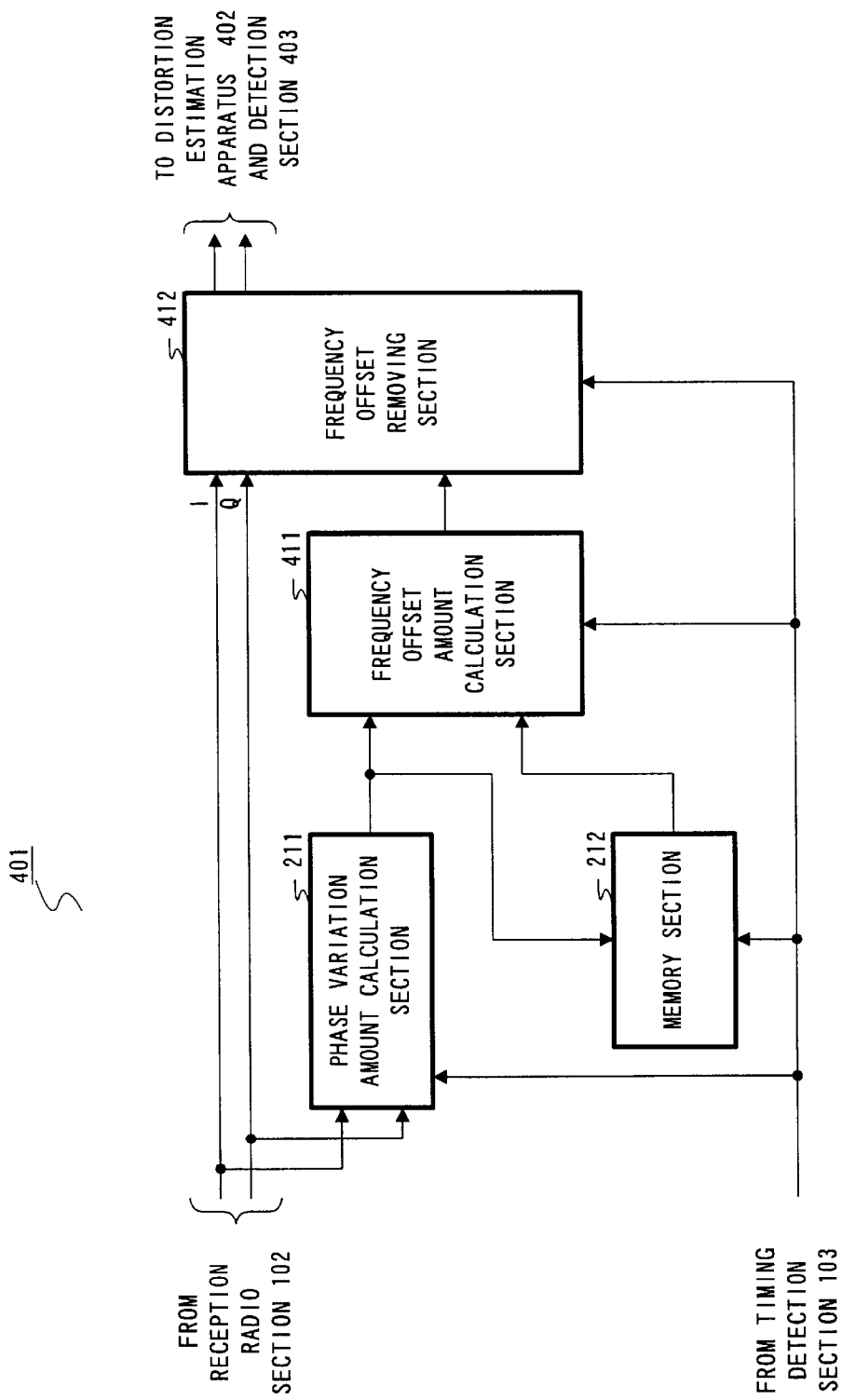
FIG. 15 is a diagram illustrating a configuration of a frequency offset compensation apparatus according to the fifth embodiment.

The internal configuration of frequency offset compensation apparatus 401 of the distortion estimation apparatus according to this embodiment is next explained using a block diagram in FIG. 15. In addition, in frequency offset compensation apparatus 401 in FIG. 15, the components having the function common to that in the frequency offset compensation apparatus 201 illustrated in FIG. 8 are given the same symbols as in FIG. 8, and the explanations thereof are omitted.

In frequency offset compensation apparatus 401, the functions of frequency offset amount calculation section 411 and frequency offset removing section 412 are different form those of frequency offset amount calculation section 213 and frequency offset removing section 214 in frequency offset compensation apparatus 201 illustrated in FIG. 8.

Frequency offset amount calculation section 411 calculates a frequency offset amount using, for example, phase variation amount $\theta_i$ and phase variation amount $\theta_{i-1}$, estimates the frequency offset amount between data symbols by the interpolation. Then, frequency offset amount calculation section 411 outputs a signal indicative of the frequency offset amount to frequency offset removing section 412. In addition, the frequency offset amount is generally obtained by averaging a plurality of phase variation amounts between pilot symbols obtained previously.

Frequency offset removing section 412 receives the inputted in-phase component and quadrature component of the received quadrature baseband signal, timing signal and the signal indicative of the frequency offset amount, and based on the frequency offset amount, removes the frequency offset amount from the in-phase component and quadrature component of received quadrature baseband signal to compensate. Frequency offset removing section 412 further outputs the in-phase component and quadrature component of the received quadrature baseband signal subjected to the frequency offset compensation to distortion estimation apparatus 402.

Figure 16:
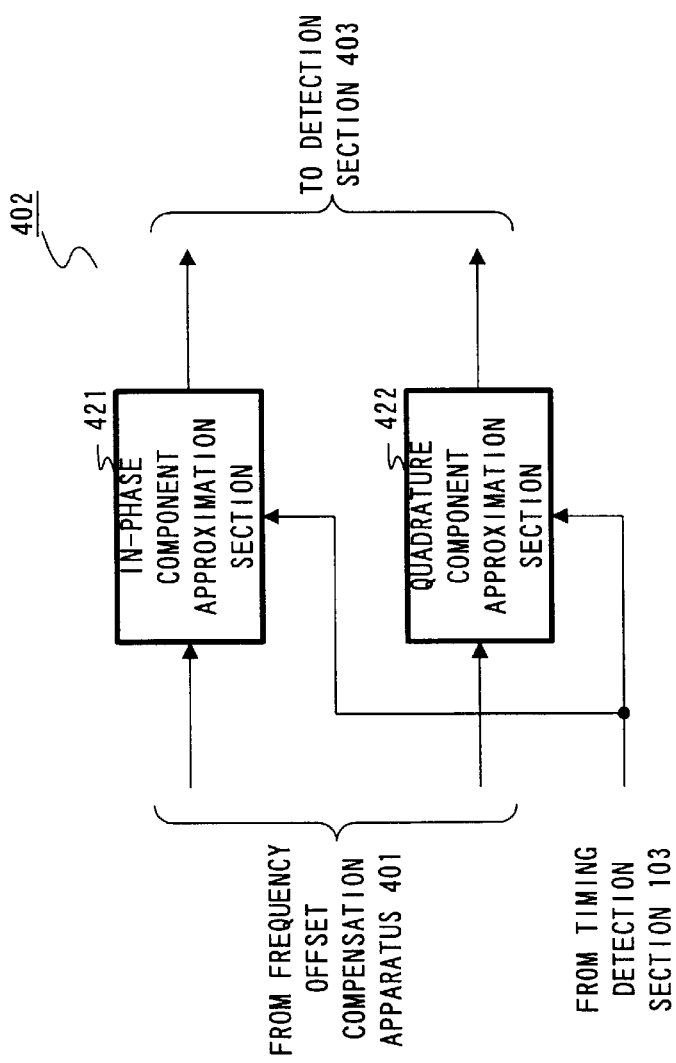
FIG. 16 is a block diagram illustrating a configuration of a distortion estimation apparatus according to a fifth embodiment of the present invention.

The internal configuration of distortion estimation apparatus 402 according to this embodiment is next explained using a block diagram in FIG. 16.

Distortion estimation apparatus 402 is mainly comprised of in-phase component approximation section 421, and quadrature component approximation section 422.

In-phase component approximation section 421 receives the inputted in-phase component of the received quadrature baseband signal subjected to the frequency offset compensation and timing signal, extracts the pilot symbol, and calculates the fading distortion amount of the in-phase component of the data symbol approximately. For example, in FIG. 3 previously described, fading distortion amount $r_k$ of the in-phase component of data symbol k (k=1 to 7) of block j is calculated with the equation (8) described previously.

Then, in-phase component approximation section 421 outputs a signal indicative of fading distortion amount $r_k$ of the in-phase component of the data symbol calculated to detection section 403.

Quadrature component approximation section 422 receives the inputted quadrature component of the received quadrature baseband signal subjected to the frequency offset compensation and timing signal, extracts the pilot symbol, and calculates the fading distortion amount of the quadrature component of the data symbol approximately. For example, in FIG. 3, fading distortion amount $s_k$ of the quadrature component of symbol k (k=1 to 7) of block j of data symbols is calculated with the equation (9) described previously.

Then, quadrature component approximation section 422 outputs a signal indicative of fading distortion amount $s_k$ of the quadrature component of the data symbol calculated to detection section 403.

Thus, by compensating the frequency offset of the received quadrature baseband signal, and estimating the fading distortion of the data symbol using the pilot symbol subjected to the frequency offset compensation, it is possible to estimate the frequency offset between a transmitter and receiver and the fading distortion with high accuracy.

Then, as illustrated in FIG. 14, by installing the above-described frequency offset compensation apparatus and distortion estimation apparatus in a reception apparatus, since it is possible to estimate the frequency offset between a transmitter and receiver and the fading distortion both with high accuracy to detect, it is possible to suppress the deterioration of the bit error rate characteristic.

Sixth Embodiment

In the sixth embodiment of the present invention, excellent bit error rate characteristic can be obtained even in the case where a fading variation is large, and a signal with low field strength is received.

Figure 17:
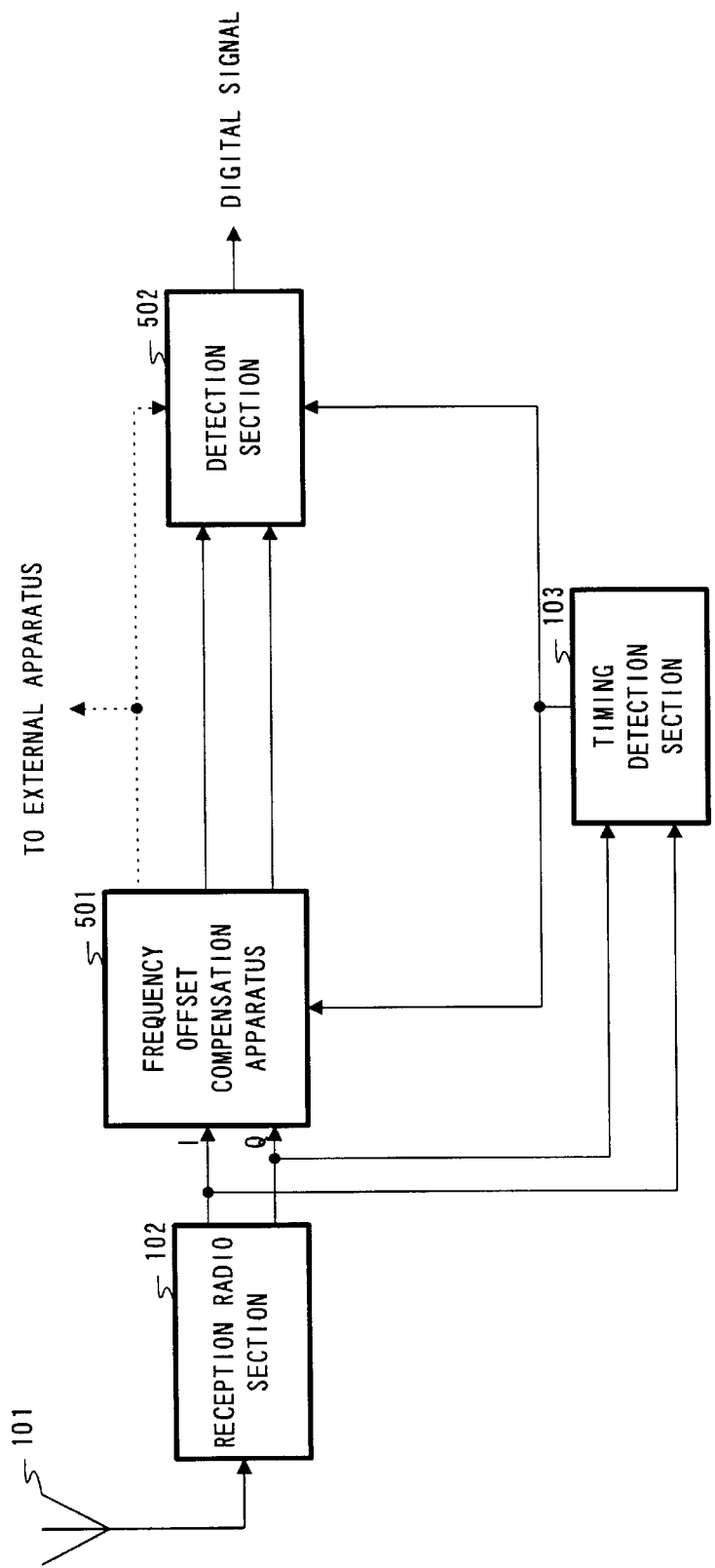
FIG. 17 is a diagram illustrating a configuration of a reception apparatus according to a sixth embodiment.

FIG. 17 is a block diagram illustrating a configuration of a reception apparatus according to the sixth embodiment of the present invention. In addition, in the reception apparatus in FIG. 17, the components having the function common to that in the reception apparatus illustrated in FIG. 14 are given the same symbols as in FIG. 14, and the explanations thereof are omitted.

In the reception apparatus in FIG. 17, the functions of frequency offset compensation apparatus 501 and detection section 502 are different from those of frequency offset compensation apparatus 401 and detection section 403 of the reception apparatus illustrated in FIG. 14. Further, the reception apparatus in FIG. 17 has a configuration in which distortion estimation apparatus 402 is eliminated as compared to the reception apparatus illustrated in FIG. 14.

Frequency offset compensation apparatus 501 receives the inputted in-phase component and quadrature component of the received quadrature baseband signal and timing signal, and extracts the pilot symbol. Then, frequency offset compensation apparatus 501 judges whether or not the pilot symbol was detected effectively, calculates a frequency offset amount using only the effectively detected pilot symbol, and compensates the frequency offset amount between data symbols by the interpolation. Then, the frequency offset compensation apparatus 501 compensates the frequency offset amount of the received quadrature baseband signal by inversely rotating the phase of the received quadrature baseband signal by the calculated or estimated frequency offset amount.

Then, frequency offset compensation apparatus 501 outputs the in-phase component and quadrature component of the received quadrature baseband signal subjected to the frequency offset compensation to detection section 502.

Figure 18:
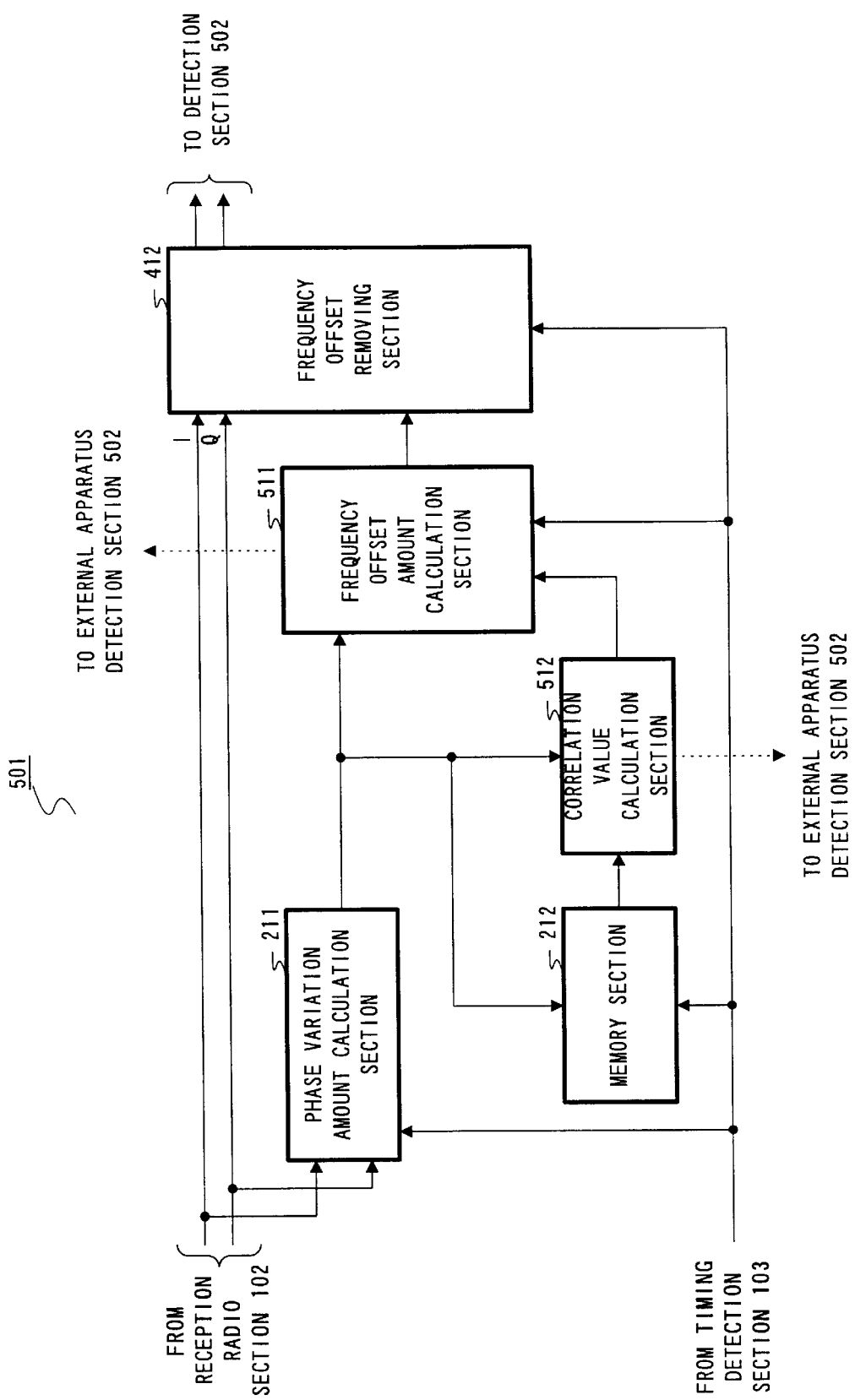
FIG. 18 is a block diagram illustrating a configuration of a frequency offset compensation apparatus according to the sixth embodiment of the present invention.

FIG. 18 is a block diagram illustrating an internal configuration of frequency offset compensation apparatus 501. In frequency offset compensation apparatus 501 in FIG. 18, the function of frequency offset amount calculation section 511 is different from that of frequency offset calculation amount section 411 in frequency offset compensation apparatus 401 illustrated in FIG. 15. Further, frequency offset compensation apparatus 501 in FIG. 18 adopts a configuration in which correlation value calculation section 512 is added as compared to frequency offset compensation apparatus 401 illustrated in FIG. 15.

Correlation value calculation section 512 receives phase variation amount $\theta_i$ inputted from phase variation amount calculation section 211 and phase variation amount $\theta_{i-1}$ inputted from memory section 212, and calculates the correlation value indicative of the correlation between phase variation amount $\theta_i$ and phase variation amount $\theta_{i-1}$ to output to frequency offset amount calculation section 511.

Based on the correlation value, frequency offset amount calculation section 511 judges whether or not there is the correlation between phase variation amount θi and phase variation amount θi−1, in other words, whether or not pilot symbol i was effectively detected.

Then, frequency offset amount calculation section 511 calculates the frequency offset amount using phase variation amount θi when judges that there is the correlation between phase variation amount θi and phase variation amount θi−1, while calculating the frequency offset amount without using phase variation amount θi when judges that there is not the correlation between phase variation amount θi and phase variation amount θi−1.

In addition, it may be possible that frequency offset amount calculation section 511 outputs the correlation result signal to an external apparatus such as a CPU not shown in the figure in the same way as in frequency offset amount calculation section 511.

Further, it may be possible that correlation value calculation section 512 outputs the correlation value signal to detection section 502, and that detection section 502 judges whether or not there is the correlation between phase variation amount θi and phase variation amount θi−1 in the same way as in correlation value calculation section 312.

Furthermore, it may be possible that correlation value calculation section 512 outputs the correlation value signal to an external apparatus such as a CPU not shown in the figure, and that the external apparatus such as the CPU judges whether or not there is the correlation between phase variation amount θi and phase variation amount θi−1, and based on the judgement result, performs an judgement of data effectiveness and judgment of channel switch such as diversity and handover, in the same way as in correlation value calculation section 312. In this case, phase variation amount calculation section 211, memory section 212 and correlation value calculation section 512 function as the control apparatus to calculate the correlation value.

Thus, by judging whether or not the pilot symbol was detected effectively, and calculating the frequency offset amount of the received quadrature baseband signal using only the effectively detected pilot symbol, it is possible to obtain excellent bit error rate characteristic even in the case where the fading variation is large, and the signal with low received field strength is received.

Seventh Embodiment

The seventh embodiment of the present invention is obtained by combining the fifth embodiment and sixth embodiment, and in this embodiment in the case where a reception apparatus has a frequency offset compensation apparatus and distortion estimation apparatus installed therein, excellent bit error rate characteristic can be obtained even in the case where a fading variation is large, and a signal with low field strength is received.

Figure 19:
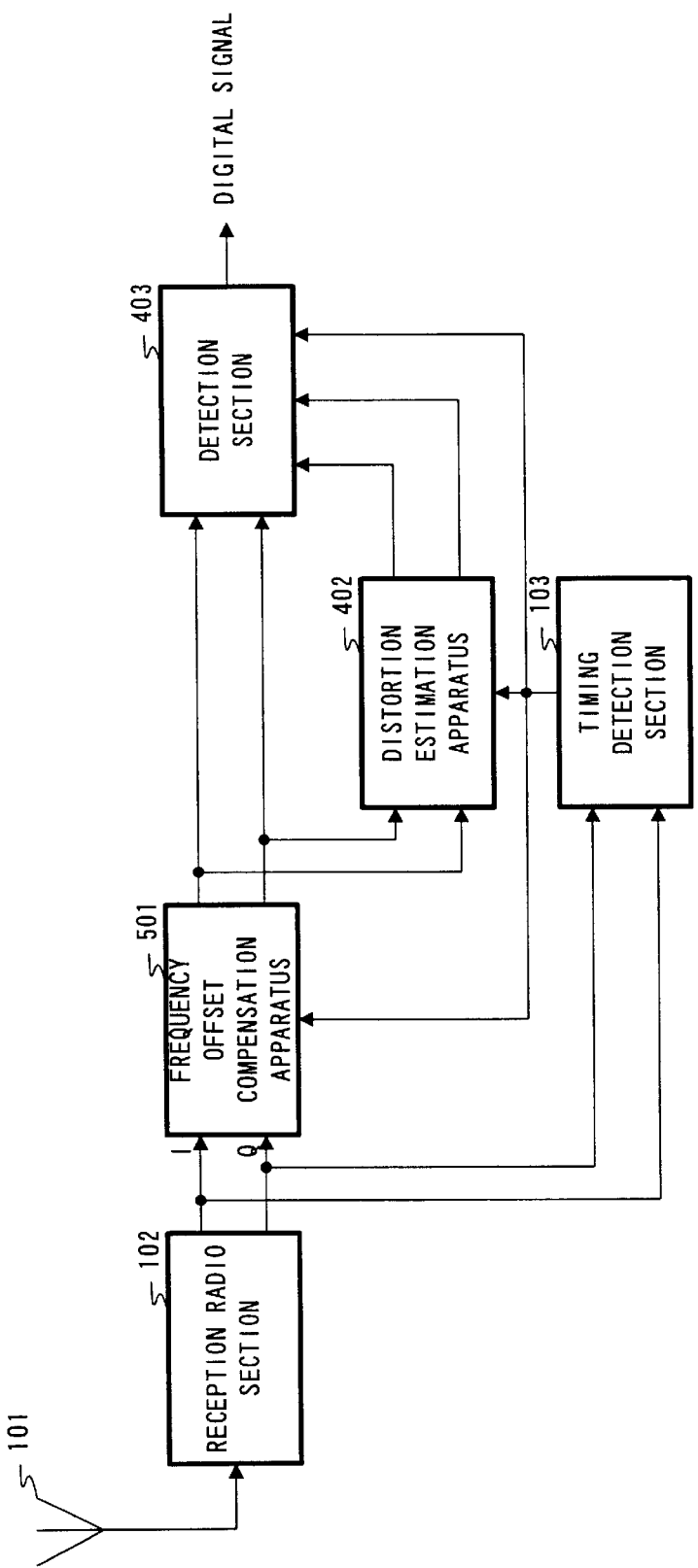
FIG. 19 is a block diagram illustrating a configuration of a reception apparatus according to a seventh embodiment of the present invention.

FIG. 19 is a block diagram illustrating a configuration of a reception apparatus according to the seventh embodiment of the present invention. In addition, in the reception apparatus in FIG. 19, the components having the function common to that in the reception apparatus illustrated in FIG. 14 are given the same symbols as in FIG. 14, and the explanations thereof are omitted.

The reception apparatus in FIG. 19 has frequency offset compensation apparatus 501 illustrated in FIG. 17 installed therein, instead of frequency offset compensation apparatus 401, as compared to the reception apparatus illustrated in FIG. 14.

Frequency offset compensation apparatus 501 receives the inputted in-phase component and quadrature component of the received quadrature baseband signal and timing signal, and extracts the pilot symbol. Then, frequency offset compensation apparatus 501 judges whether or not the pilot symbol was detected effectively, calculates the frequency offset amount using only the effectively detected pilot symbol, and estimates the frequency offset amount between data symbols by the interpolation. Then, frequency offset compensation apparatus 501 compensates the frequency offset amount of the received quadrature baseband signal by inversely rotating the phase of the received quadrature baseband signal by the calculated or estimated frequency offset amount.

Then, frequency offset compensation apparatus 501 outputs the in-phase component and quadrature component of the received quadrature baseband signal subjected to the frequency offset compensation to distortion estimation apparatus 402 and detection section 403.

Distortion estimation apparatus 402 receives the inputted in-phase component and quadrature component of the received quadrature baseband signal subjected to the frequency offset compensation and timing signal, estimates amplitude variation amounts of the in-phase component and quadrature component of the received quadrature baseband signal, and outputs the estimated results to detection section 403.

Detection section 403 executes detection processing on the in-phase component and quadrature component of the received quadrature baseband signal subjected to the frequency offset compensation using the amplitude variation amounts of the in-phase component and quadrature component of the received quadrature baseband signal, and outputs a digital signal.

Thus, by judging whether or not the pilot symbol was detected effectively, calculating the frequency offset amount of the received quadrature baseband signal using only the effectively detected pilot symbol to compensate the frequency offset of the received quadrature baseband signal, and estimating the fading distortion of the data symbol using the pilot symbol subjected to the frequency offset compensation, it is possible to obtain excellent bit error rate characteristic even in the case where the fading variation is large, and the signal with low received field strength is received, and further to estimate the frequency offset between a transmitter and receiver and fading distortion with high accuracy.

In addition, the explanation is performed using the single carrier system as the communication system in each embodiment described above. However, in the present invention, the communication system is not limited, and it may be possible, in the case where an orthogonal frequency division multiplexing system is used, to estimate the frequency offset and fading distortion with high accuracy in demodulating a signal with each subcarrier, and to suppress the deterioration of bit error rate characteristic due to the frequency offset between a transmitter and receiver and fading distortion.

Further, in the case where a code division multiple access system is used, in the same way as in the single carrier system, it may be possible to estimate the frequency offset and fading distortion with high accuracy after despreading, and to suppress the deterioration of bit error rate characteristic due to the frequency offset between a transmitter and receiver and fading distortion.

In addition, the present invention is not limited in frame structure of a received signal, and is achieved in other cases besides that illustrated in FIG. 3. Further, although each embodiment described above explains about the case where the first-order Gaussian polynomial approximation is used as a polynomial approximation, the present invention is not limited to the above case, and the same effects may be obtained using other approximation systems such as least square method.

The present invention is not limited to the above described embodiments, and various variations and modifications may be possible without departing from the scope of the present invention.

This application is based on the Japanese Patent Applications Nos. HEI11-034038 filed on Feb. 12, 1999, No. HEI11-041227 filed on Feb. 19, 1999, and No. HEI11-044390 filed on Feb. 23, 1999, entire contents of which are expressly incorporated by reference herein.

What is claimed is:

1. A reception apparatus comprising:
   a receiver that receives a signal comprising a known symbol inserted between data symbol sequences;
   a frequency offset compensator that is configured to:
      calculate a frequency offset amount based on a phase variation amount between received known symbols;
      estimate the frequency offset amount of a received data symbol based on the frequency offset amount of the received known symbols; and
      remove a frequency offset of said known symbol and said data symbol; and
   a distortion estimator that estimates an amplitude variation amount of said data symbol from which the frequency offset is removed, based on the amplitude variation amount of said known symbol from which the frequency offset is removed.

2. The reception apparatus according to claim 1, wherein said distortion estimator comprises:
   an amplitude variation amount estimator that estimates an amplitude variation amount of said data symbol based on the amplitude variation amount of said known symbol; and
   a phase variation amount estimator that estimates a phase variation amount of said data symbol based on the phase variation amount of said known symbol.

3. The reception apparatus according to claim 2, wherein said amplitude variation amount estimator estimates the amplitude variation amount of said data symbol by an interpolation based on the amplitude variation amount of said known symbol.

4. The reception apparatus according to claim 2, wherein said phase variation amount estimator estimates the phase variation amount of said data symbol by an interpolation based on the phase variation amount of said known symbol.

5. The reception apparatus according to claim 1, wherein, when an electrical field strength of a known symbol is above a predetermined threshold level, said frequency offset compensator determines that the known symbol is detected effectively, and calculates the frequency offset amount based only on the effectively detected known symbol.

6. The reception apparatus according to claim 1, wherein said frequency offset compensator comprises:
   a correlation value calculator that calculates a correlation value indicating a difference between a phase variation amount of a currently received known symbol and a phase variation amount of a previously received known symbol;
   a frequency offset amount calculator that calculates a first frequency offset amount of said currently received known symbol based on a plurality of known symbols satisfying a predetermined condition set according to the correlation value; and
   a frequency offset remover that removes a frequency offset of said currently received known symbol based on said first frequency offset amount.

7. The reception apparatus according to claim 6, wherein said frequency offset amount calculator calculates said first frequency offset amount based on phase variation amounts of a plurality of said known symbols having a correlation value equal to or below a predetermined threshold level.

8. The reception apparatus according to claim 6, wherein said frequency offset remover estimates a second frequency offset amount of a data symbol based on the frequency offset amount of a known symbol, and removes a frequency offset of said data symbol based on said second frequency offset amount.

9. The distortion estimation apparatus according to claim 8, wherein said frequency offset remover estimates said second frequency offset amount by an interpolation based on the frequency offset amount of said known symbol.

10. A distortion estimation method of a reception apparatus that receives a signal comprising a known symbol inserted between data symbol sequences and that estimates a distortion, the method comprising:
    calculating a frequency offset amount based on a phase variation amount in a received known symbol;
    estimating a frequency offset amount of a received data symbol based on the frequency offset amount of the received known symbol;
    removing a frequency offset of the known symbol and the data symbol; and
    estimating an amplitude variation amount of the data symbol from which the frequency offset is removed, based on the amplitude variation amount of the known symbol from which the frequency offset is removed.

11. The distortion estimation method according to claim 10, further comprising:
    calculating a correlation value that indicates a difference between a phase variation amount of a currently received known symbol and a phase variation amount of a previously received known symbol;
    calculating a first frequency offset amount of the currently received known symbol based on a plurality of known symbols satisfying a predetermined condition in accordance with the correlation value; and
    removing the frequency offset of the currently received known symbol based on the first frequency offset amount.

12. The distortion estimation method according to claim 11, further comprising:
    estimating a second frequency offset amount of a data symbol based on a frequency offset amount of a known symbol; and
    removing a frequency offset of the data symbol using the second frequency offset amount.

* * * * *